(12) United States Patent
Graham et al.

(10) Patent No.: US 12,163,606 B2
(45) Date of Patent: Dec. 10, 2024

(54) HIGH-PRESSURE ROTATING FITTING

(71) Applicant: Caterpillar Inc., Peoria, IL (US)

(72) Inventors: Curtis John Graham, Peoria, IL (US); Christopher Anthony Kinney, Iuka, MS (US); Robert E. Sharp, Corinth, MS (US); Ryan Dean Macy, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 239 days.

(21) Appl. No.: 17/521,537

(22) Filed: Nov. 8, 2021

(65) Prior Publication Data
US 2023/0143692 A1  May 11, 2023

(51) Int. Cl.
*F16L 27/08* (2006.01)
*F16C 19/06* (2006.01)

(52) U.S. Cl.
CPC .......... *F16L 27/0828* (2013.01); *F16C 19/06* (2013.01); *F16L 27/0812* (2013.01); *F16L 27/0841* (2013.01)

(58) Field of Classification Search
CPC .... F16L 27/0828; F16L 27/0824; F16L 27/08
See application file for complete search history.

(56) References Cited

U.S. PATENT DOCUMENTS

| | | | | |
|---|---|---|---|---|
| 2,305,524 A | * | 12/1942 | Frazer-Nash | F16L 27/0828 285/91 |
| 2,382,375 A | * | 8/1945 | Allen | F16L 27/0828 285/94 |
| 2,384,360 A | * | 9/1945 | Allen | F16L 27/0828 285/179 |
| 2,394,715 A | * | 2/1946 | Phillips | F16L 27/0828 285/82 |
| 2,444,868 A | * | 7/1948 | Allen | F16L 27/0828 285/94 |
| 2,509,091 A | * | 5/1950 | Faccou | F16L 27/0828 285/94 |
| 2,549,951 A | * | 4/1951 | Warren | F16L 27/0828 285/94 |
| 2,927,804 A | * | 3/1960 | Snyder | F16L 27/0828 285/379 |

(Continued)

FOREIGN PATENT DOCUMENTS

| | | | | |
|---|---|---|---|---|
| CN | | 108131519 B | 5/2019 | |
| WO | WO-2018118678 A1 | * | 6/2018 | ......... F16L 27/0828 |

*Primary Examiner* — Matthew Troutman
*Assistant Examiner* — Fannie Kee

(57) ABSTRACT

A fitting has a first housing including a first body and a second body. The first body defines a first channel and a second channel, and second body defines a third channel that is co-planar with the first channel and a fourth channel that is co-planar with the first channel. First bearings are disposed within the first channel and the third channel, where the first bearings rotatably coupled the first housing to the second housing. Additionally, second bearings are disposed within the second channel and the fourth channel, the second bearings rotatably coupling the first housing to the second housing. A plug couples to the first housing, a gasket is disposed between the plug and the first housing, and a passage is defined at least in part by the first housing, the second housing, and the plug.

14 Claims, 14 Drawing Sheets

(56) References Cited

U.S. PATENT DOCUMENTS

| | | | |
|---|---|---|---|
| 2,927,805 A * | 3/1960 | Faccon | F16L 27/0828 |
| | | | 285/95 |
| 3,002,769 A | 10/1961 | Deublin | |
| 3,244,440 A * | 4/1966 | Ashton | F16L 27/08 |
| | | | 285/276 |
| 3,497,244 A * | 2/1970 | Grantom | F16L 27/0828 |
| | | | 285/98 |
| 4,296,952 A * | 10/1981 | McCracken | F16L 27/0828 |
| | | | 285/98 |
| 4,561,681 A * | 12/1985 | Lebsock | F16L 27/0828 |
| | | | 285/276 |
| 4,817,995 A * | 4/1989 | Deubler | F16L 27/0828 |
| | | | 285/98 |
| 5,607,189 A | 3/1997 | Howeth | |
| 5,753,799 A * | 5/1998 | Shah | F16L 27/0828 |
| | | | 73/40 |
| 5,851,034 A * | 12/1998 | Shah | F16L 27/08 |
| | | | 285/272.1 |
| 7,823,806 B2 | 11/2010 | Schmon | |
| 8,191,504 B2 | 6/2012 | Blankenship | |
| 8,590,809 B2 | 11/2013 | Escoto, Jr. et al. | |
| 2003/0209612 A1 | 11/2003 | Hahnen | |
| 2019/0195402 A1 | 6/2019 | Oestreich | |

\* cited by examiner

HIGH-PRESSURE ROTATING FITTING

TECHNICAL FIELD

The present disclosure relates to a fitting for use in material additive processes, and more particularly, to a rotating fitting that reduces fatigue and wear experienced by a supply line during a metal additive process.

BACKGROUND

Metal spraying is a process used across a range of industries and involves applying a coat of powdered metal to a surface. In metal spraying, metal particles travel at high velocities, in a molten or semi-molten state, before being impinged onto the surface. For example, nitrogen may be heated to temperatures up to 800° C., at a pressures up to 1200 pounds per square inch (PSI) to spray the metal particles.

In some cases, spray guns can be used to direct heated, pressurized gas containing metal particles onto a surface of a receiving structure. Such spray guns are usually mounted to robots that articulate according to desired spray patterns. In this process, the heated, pressurized gas containing metal particles are directed to the spray gun via one or more relatively flexible supply lines that are connected to the spray gun via one or more respective couplings. While being flexible enough to provide a steady flow of metal particles to the spray gun during movement of the spray gun, the supply lines and the respective couplings are also robust enough to handle gasses and metal particles at the temperatures and pressures noted above. However, it is common to repeatedly twist, rotate, and/or otherwise manipulate the spray gun and connected power lines during metal spraying processes. Over time, such manipulation causes fatigue in the hot gas supply line and leads to failure.

Example components configured to handle fluids at relatively high temperatures and pressures are described in, for example, Chinese Publication No. 108,131,519 (hereinafter the "'519 reference"). The '519 reference describes a rotary sealing joint, having a ball base and a ball head, used for connection between two high-temperature and high-pressure pipelines. Rings included in the rotary sealing joint are packed into a ball seat, between the two high-pressure pipelines, to seal a high-temperature fluid in the pipelines. The rings described in the '519 reference generate elastic-plastic deformation that form a seal of the ball head and the ball base. However, the components describe in the '519 reference are not adaptable to changing conditions in the pipelines and/or further tightening to increase a seal as components become worn. As a result, the rotating sealing joint and other fluid handling components described in the '519 may require routine replacement and/or the rotating sealing joint may fail to seal the pipelines, leading to a loss of pressure.

Examples of the present disclosure are directed toward overcoming one or more of the deficiencies noted above.

SUMMARY

According to a first aspect a fitting comprises a first housing having an outer surface, the outer surface defining a first channel and a second channel spaced from the first channel, a second housing rotatably coupled to the first housing, the second housing having an inner surface, the inner surface defining a third channel and a fourth channel, the third channel mating with and surrounding the first channel to form a first retention chamber, and the fourth channel mating with and surrounding the second channel to form a second retention chamber, a first bearing disposed within the first retention chamber, the first bearing preventing separation of the first housing and the second housing, a second bearing disposed within the second retention chamber, the second bearing preventing separation of the first housing and the second housing, an annular gasket forming a substantially fluid-tight seal between the outer surface of the first housing and the inner surface of the second housing, a plug movably connected to the first housing, the plug being configured to apply a compression force to the annular gasket, the outer surface of the first housing, and the inner surface of the second housing, and a passage defined at least in part by the first housing, the second housing, and the plug.

According to a further aspect an assembly comprises a first housing having a first channel, a gasket, a plug coupled to the first housing, the plug engaging the gasket between the first housing and the plug, a second housing disposed over the plug and at least a portion of the first housing, the first housing being rotatable within the second housing, the second housing having a second channel that aligns with the first channel to form a retention chamber, and a bearing disposed within the first channel and the second channel, the bearing preventing separating of the first housing and the second housing.

According to a further aspect a fitting comprises a first housing configured to couple to a spray gun, a second housing configured to couple to a supply line, the second housing being disposed over at least a portion of the first housing, the first housing being rotatable within the second housing, the second housing remaining stationary during a rotation of the first housing, a graphite gasket engaging with an interior surface the second housing, and a plug coupled to the first housing, the plug engaging the graphite gasket between the plug and the first housing.

BRIEF DESCRIPTION OF THE FIGURES

The detailed description is described with reference to the accompanying figures. In the figures, the left-most digit or digits of a reference number identifies the figure in which the reference number first appears. The systems depicted in the accompanying figures are not to scale and components within the figures may be depicted not to scale with each other.

DETAILED DESCRIPTION

Wherever possible, the same reference numbers will be used throughout the drawings to refer to the same or like parts.

Figure 1:
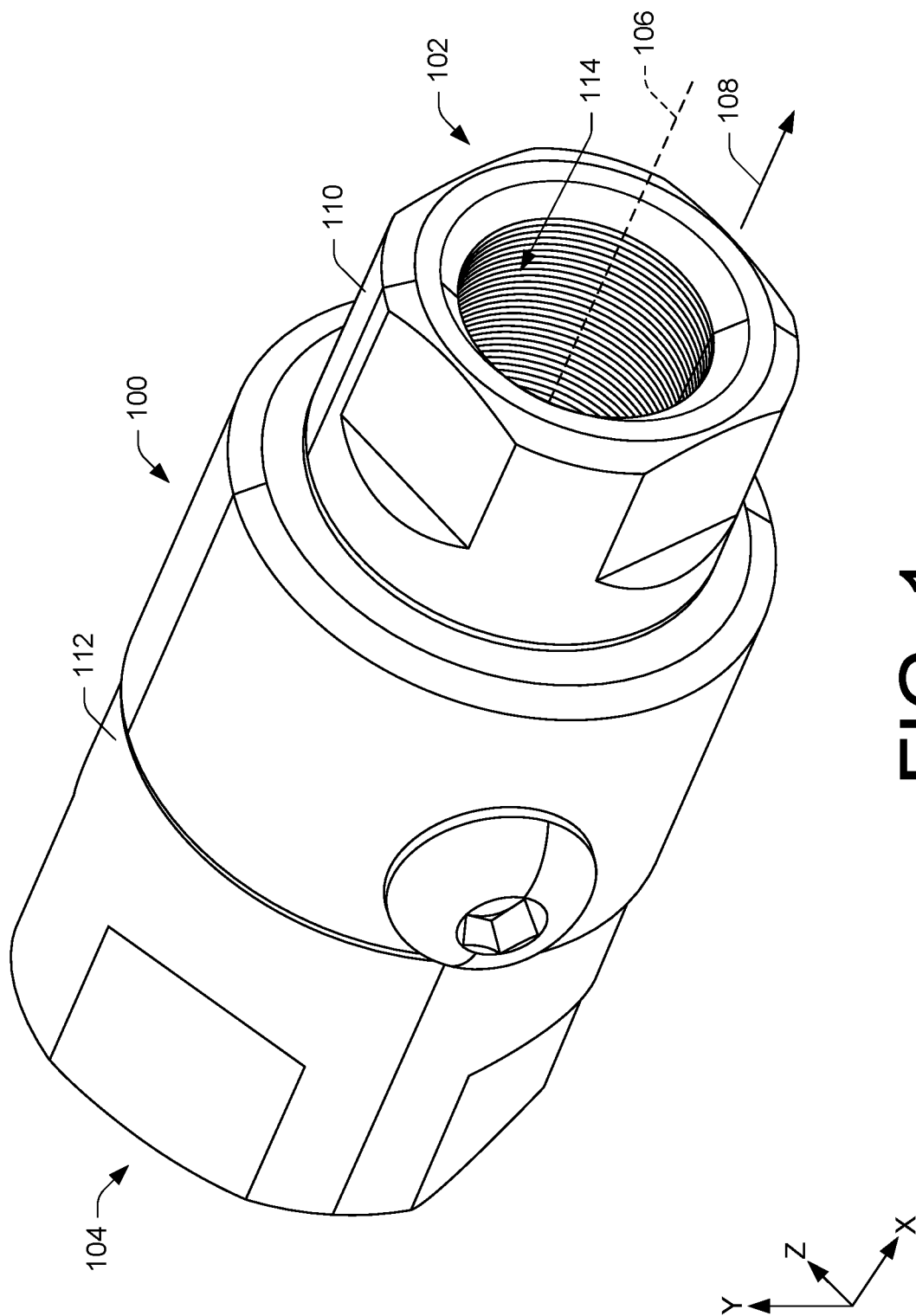
FIG. 1 illustrates a perspective view of an example first rotating fitting, according to an embodiment of the present disclosure.

FIG. 1 illustrates a perspective view of an example rotating fitting 100. In some instances, the rotating fitting 100 represents a rotary fitting or union that may find use in a high-pressure metal spray processes to remanufacture parts. However, the concepts discussed herein are not limited to such applications, and the rotating fitting 100 may find use in other fields and/or for other purposes, such as hot gas applications that require articulating joints. The rotating fitting 100 is shown including a substantially cylindrical shape, however, other shapes are envisioned (e.g., rectangular, hexagonal, etc.).

The rotating fitting 100 includes a proximal end 102, and a distal end 104 opposite the proximal end 102. The proximal end 102 is spaced from the distal end 104 along a longitudinal axis 106 of the rotating fitting 100 (e.g., in the X-direction shown in FIG. 1). The proximal end 102 is configured to fluidly connect with and/or otherwise couple to a spray gun (not shown) or other nozzle that is configured to dispense powdered metal, gases (e.g., Nitrogen), and so forth. The proximal end 102 may include threads or other male/female connectors for coupling to the spray gun, for example. The distal end 104 may couple to a supply line (not shown) for receiving the gases. The distal end 104 may include threads or other male/female connectors for coupling to the supply line. The gases are dispersed out of the proximal end 102 in a flow direction 108. The flow direction 108 is substantially parallel to the longitudinal axis 106 of the rotating fitting 100. However, in some instances, the flow direction 108 of the rotating fitting is reversed, and material and gas may flow from the proximal end 102 to the distal end 104.

In some instances, the rotating fitting 100 is formed via two housings that operably couple to one another. For example, the rotating fitting 100 may be formed at least in part by a first housing 110 and a second housing 112. The first housing 110 is shown disposed at the proximal end 102, while the second housing 112 is shown disposed at the distal end 104. The first housing 110 represents an inner housing that nestles at least partially within the second housing 112. Stated alternatively, the second housing 112 may receive or enclose at least part of the first housing 110.

In some instances, the first housing 110 represents a portion of the rotating fitting 100 that rotates during use (e.g., about the X-axis), whereas the second housing 112 represents a portion of the rotating fitting 100 that remains fixed (e.g., stationary) during use. As such, the first housing 110 may rotate within the second housing 112 (e.g., clockwise or counterclockwise about the longitudinal axis 106). As discussed herein in regard to FIGS. 6 and 7, the first housing 110 and the second housing 112 define, or form, a passage 114 that extends through rotating fitting 100 for channeling the gases out the proximal end 102. Additionally, as will be discussed in FIGS. 6 and 7, the first housing 110 and the second housing 112 may rotatably couple to one another via ball bearings, fasteners, and so forth. Such coupling may secure the first housing 110 within the second housing 112, and permit the rotational movement of the first housing 110. However, although the first housing 110 is discussed as rotating within the second housing 112, in some instances, the first housing 110 may represent a portion of the rotating fitting 100 that remains fixed and the second housing 112 may represent a portion of the rotating fitting 100 that rotates.

The rotating fitting 100 reduces, or eliminates, fatigue and failure in supply lines. For example, the rotating fitting 100 permits the spray gun to rotate while keeping the supply line fixed. In other words, the rotating fitting 100 allows for the spray gun to rotate without transferring such movement to the supply line. In doing so, the rotating fitting 100 reduces, or eliminates, fatigue in the supply line. Additionally, the rotating fitting is made from materials that are configured to endure the high temperatures (e.g., between 300° C. and 800° C.) and the high pressures (e.g., between 400 PSI and 1200 PSI) in the supply line.

Figure 2:
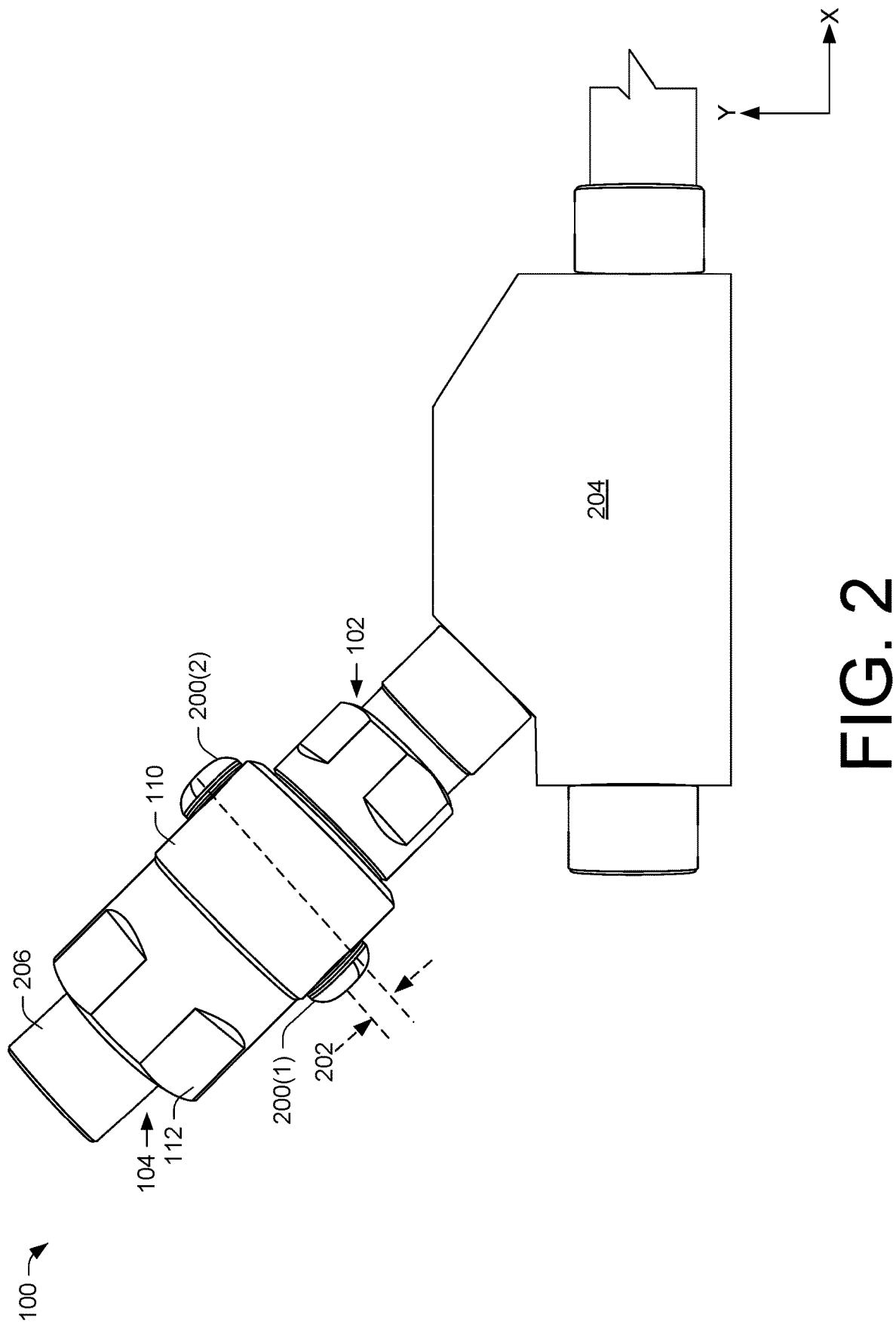
FIG. 2 illustrates a side view of the first rotating fitting of FIG. 1, according to an embodiment of the present disclosure.

FIG. 2 illustrates a side view of the rotating fitting 100. As introduced above, the rotating fitting 100 includes the first housing 110 rotatably coupled to the second housing 112. The first housing 110 couples to a spray gun, at the proximal end 102, while the second housing 112 couples to a supply line at the distal end 104 for receiving the gases.

The rotating fitting 100 is shown including two fasteners 200, such as a first fastener 200(1) and a second fastener 200(2) coupled to the second housing 112. As discussed herein in relation to FIGS. 5-7, the fasteners 200 may provide access to channels, grooves, or retention chambers within which bearings reside. For example, removing the fasteners 200 from the second housing 112 may expose respective grooves, channel, retention chambers, and the like formed at least in part by the first housing 110 and the second housing 112 (or bodies thereof). When removed, bearings (e.g., ball bearings, cylindrical bearings, tapered bearings, etc.) maybe placed through sockets, passages, or ports within which the first fastener 200(1) and the second fastener 200(2) engage, respectively. Therein, the bearings may enter the retention chambers, respectively, for coupling the first housing 110 and the second housing 112 together, as well as providing the rotational movement of the rotating fitting 100. In some instances, the fasteners 200 may represent hexagonal screws that are threaded within the second housing 112.

The first fastener 200(1) and the second fastener 200(2) are shown spaced apart in a direction along the longitudinal axis 106 by a distance 202 (X-direction). The distance 202 may represent a distance disposed between a centerline of the retention chambers formed in the first housing 110 and the second housing 112. In other words, the bearings within the retention chambers, which are spaced apart by the distance 202, may create two regions, areas, zones, or points of contact between the first housing 110 and the second housing 112 that annularly extend around first housing 110 and the second housing 112. The two points of contact securely couples the first housing 110 and the second housing 112 together, and allows the rotating fitting 100 to endure high pressures (e.g., between approximately 400 PSI and 1200 PSI).

The proximal end 102 and the distal end 104 (or respective portions of the first housing 110 and the second housing 112) may include fittings or fixtures that accept wrenches, tools, and so forth. Such fixtures assist in tightening the rotating fitting 100 to the spray gun and/or supply line. Additionally, the proximal end 102 (or the first housing 110) and/or the distal end 104 (or the second housing 112) may include threads with which the spray gun and the supply line mate, respectively. Such threads may be located on an interior of the rotating fitting 100 or on an exterior of the rotating fitting in alternate embodiments.

As further shown in FIG. 2, the rotating fitting 100 couples at the proximal end 102 to a spray gun 204. The distal end 104 couples to a supply line 206 for receiving heated gas. The spray gun 204 further couples to other lines, such as a line that supplies powdered metal. Within the spray gun 204 the heated gas and the powdered metal may mix for being dispersed out of the spray gun 204.

The rotating fitting 100 therefore includes components, such as the fasteners 200, that assist in coupling the first housing 110 and the second housing 112 together. Such coupling may come by way of bearings that reside within retention chambers of the first housing 110 and the second housing 112. Moreover, the use of bearings provides rotating movement and reduces the amount of motion imparted to the supply line.

Figure 3:
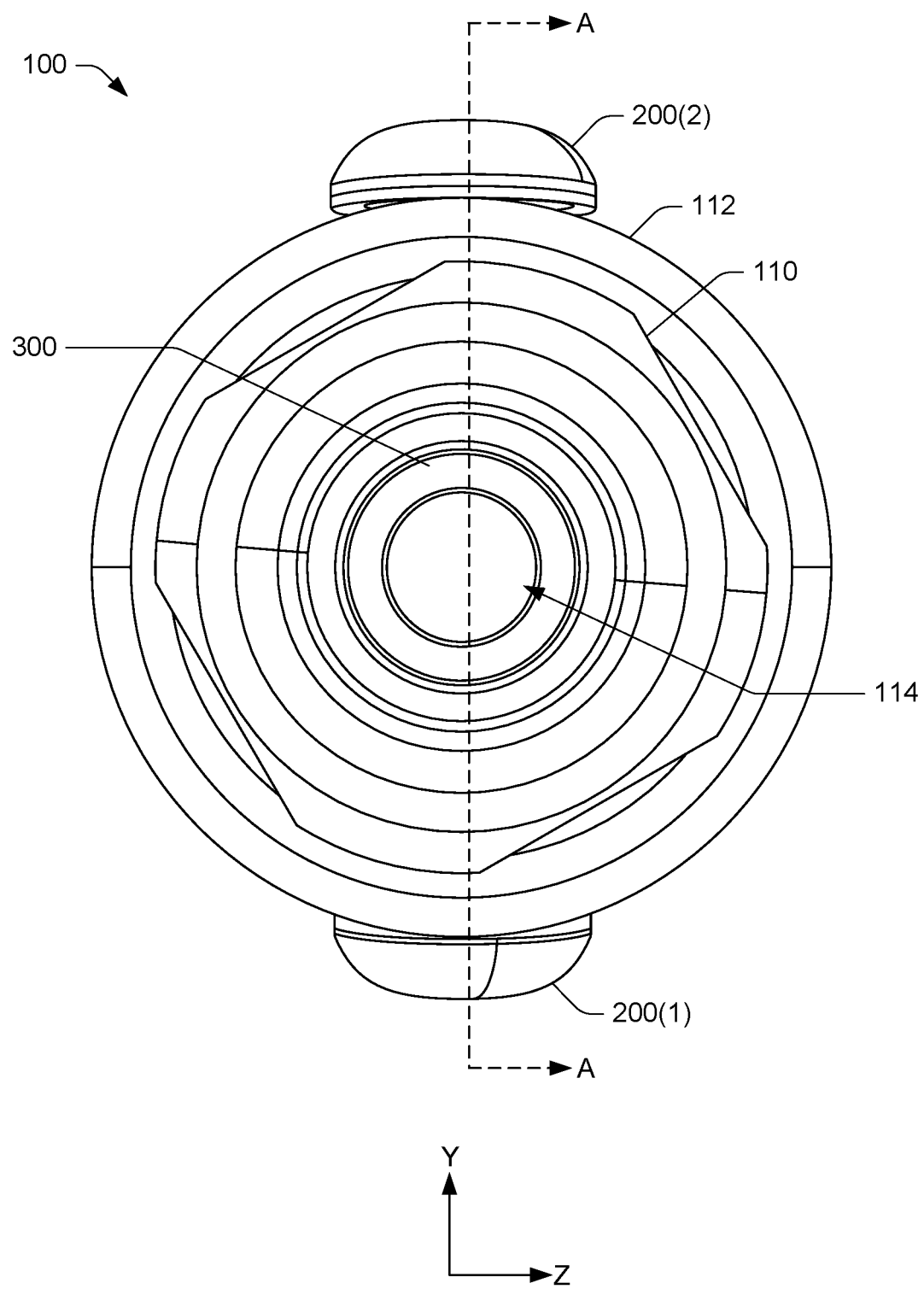
FIG. 3 illustrates a first end view of the first rotating fitting of FIG. 1, according to an embodiment of the present disclosure.

FIG. 3 illustrates an end view of the rotating fitting 100. The view shown in FIG. 3 represents a planar view of the proximal end 102, looking down into the passage 114 of the rotating fitting 100 towards the distal end 104. The passage 114, as noted above, is defined at least in part by the first housing 110 and the second housing 112, and may span a longitudinal length of the rotating fitting 100 (X-direction).

As shown in FIG. 3, and as will be discussed in more detail with regard to FIGS. 5-7, the rotating fitting 100 includes a plug 300 that couples to the first housing 110. The plug 300 may form a portion of the passage 114 and may be disposed at least partially between the first housing 110 and the second housing 112 (within the rotating fitting 100). The plug 300 serves to secure a gasket within the rotating fitting 100. The gasket seals the first housing 110 and the second housing 112 together to prevent leakage of the gases. During rotation of the first housing 110, the plug 300 correspondingly rotates with the first housing 110.

The first fastener 200(1) and the second fastener 200(2) are shown being aligned along a similar plane (Y-plane), or on opposing sides of the second housing 112. In some instances, the first fastener 200(1) and the second fastener 200(2) may be disposed at other locations on the second housing 112, closer to one another, and/or on different planes.

FIG. 3 further illustrates a line A-A that extends through the rotating fitting 100. Details of a cross-sectional view of the rotating fitting 100, taken along line A-A, are discussed herein with regard to FIGS. 6 and 7.

The first housing 110, the second housing 112, and the plug 300 therefore define the passage 114 through which gases travel, from the distal end 104 to the proximal end 102. The plug 300, as will be discussed in further detail herein, further assists in sealing the first housing 110 and the second housing 112 together, preventing leakage of the gases between the first housing 110 and the second housing 112.

Figure 4:
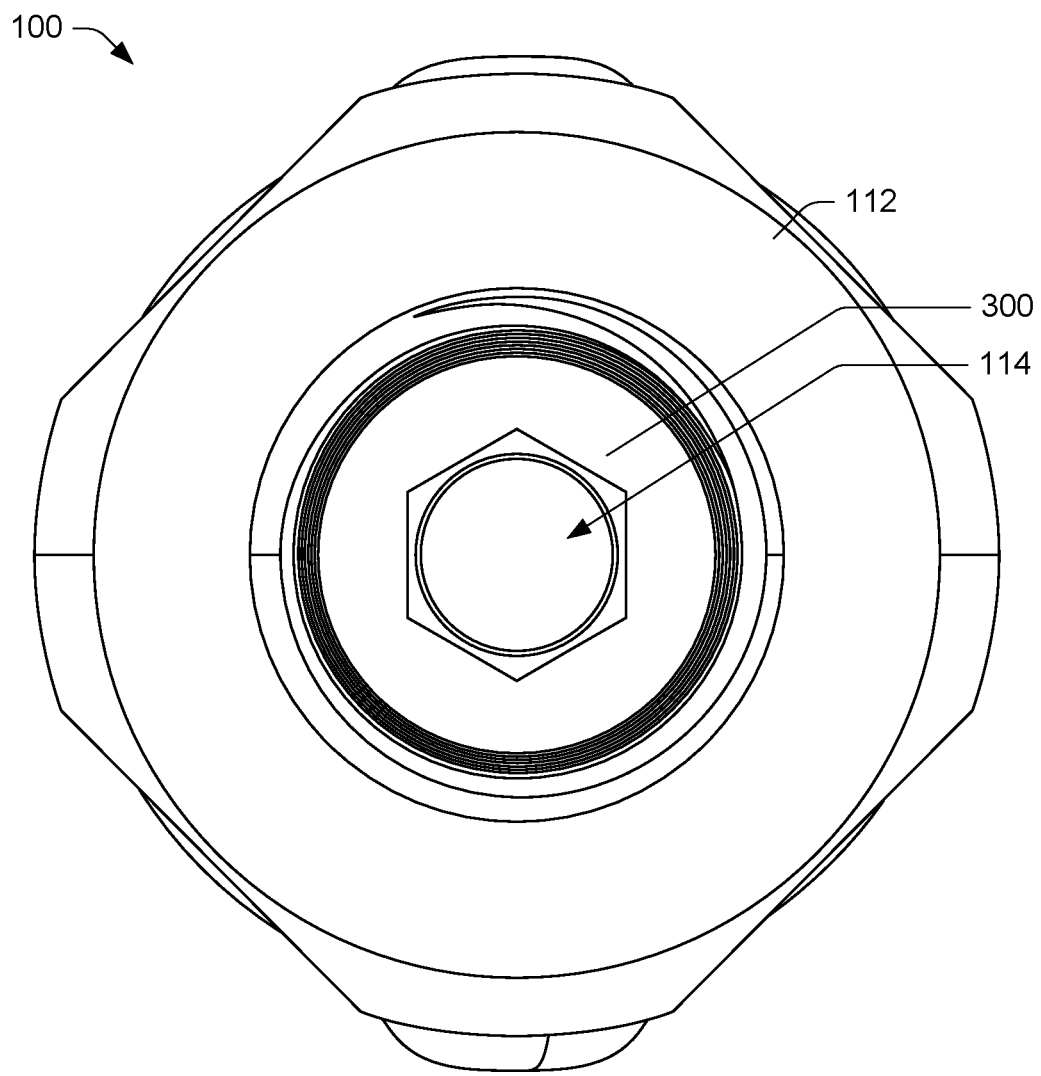
FIG. 4 illustrates a second end view of the first rotating fitting of FIG. 1, according to an embodiment of the present disclosure.

FIG. 4 illustrates an end view of the rotating fitting 100. The view shown in FIG. 4 represents a view of the distal end 104, looking into the passage 114 of the rotating fitting 100 towards the proximal end 102. The passage 114, as noted above, is defined at least in part by the first housing 110 and the second housing 112, and may span the longitudinal length of the rotating fitting 100 (X-direction).

As introduced above in FIG. 3, the rotating fitting 100 includes the plug 300 that couples to the first housing 110. The plug 300 secures a gasket within the rotating fitting 100, to create a seal between the first housing 110 and the second housing 112. The plug 300 is shown including a hexagonal head for coupling the plug 300 to the first housing 110. In some instances, the plug 300 is tightened after use of the rotating fitting 100 and/or as the gasket becomes worn. For example, further tightening of the plug (e.g., via a hexagonal socket), may compress the gasket between the plug 300 and the first housing 110. This compression may increase the seal between the first housing 110 and the second housing 112 by radially expanding the gasket against the first housing 110 and the second housing 112. Additionally, as shown, the hexagonal head of the plug 300 is accessible at the distal end 104, through the second housing 112.

Therefore, in FIG. 4, the plug 300 is used to secure the gasket within the rotating fitting 100. After a prolonged use of the rotating fitting 100, and as the gasket becomes worn or in need of replacement, the plug 300 may be further tightened to increase a seal between the first housing 110 and the second housing 112, and/or may be uncoupled from the first housing 110. The plug 300 therefore permits maintenance of the rotating fitting 100 in a convenient manner.

Figure 5:
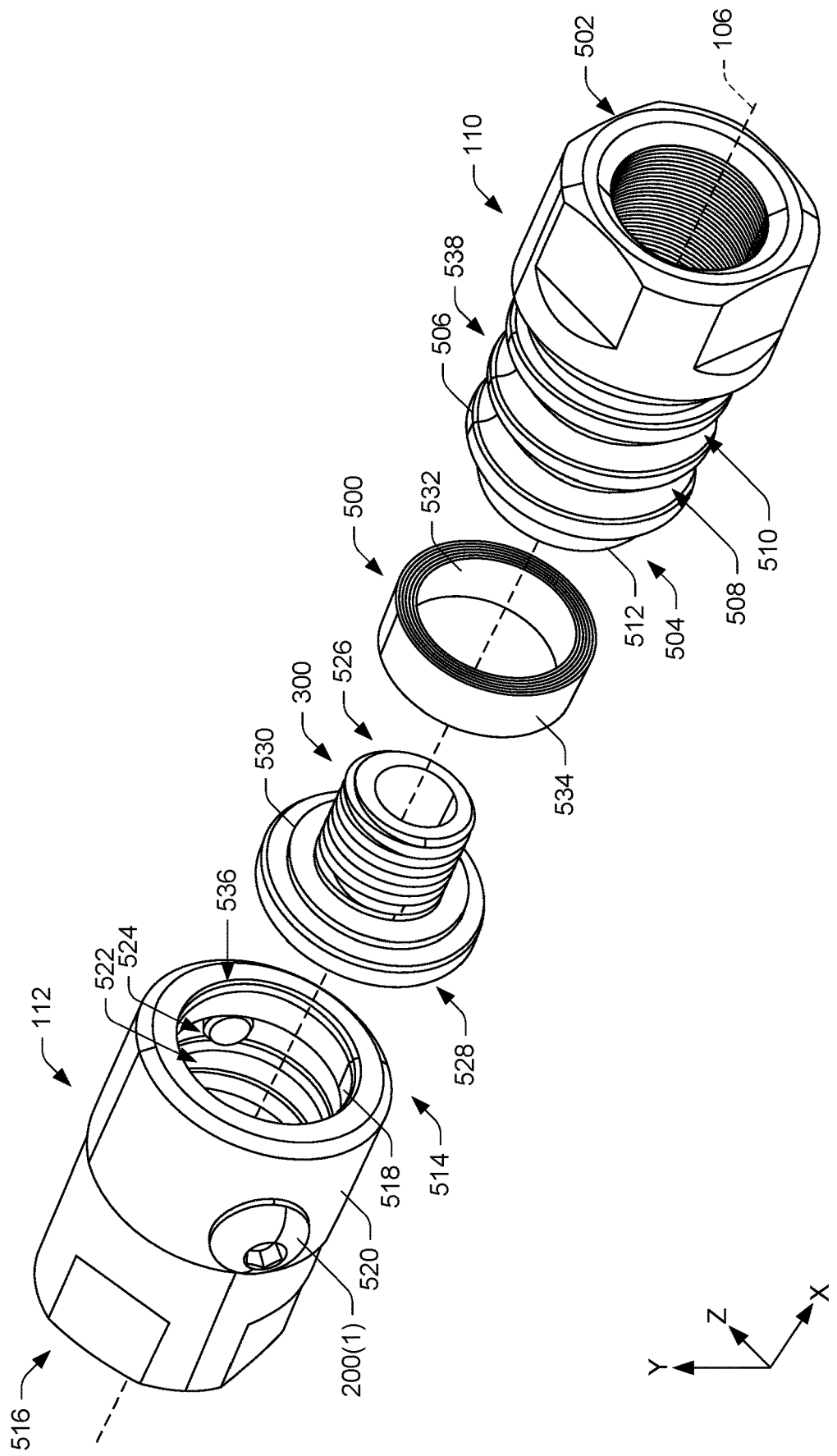
FIG. 5 illustrates an exploded view of the first rotating fitting of FIG. 1, according to an embodiment of the present disclosure.

FIG. 5 illustrates an exploded view of the rotating fitting 100, showing the first housing 110, the second housing 112, the plug 300, and a gasket 500. The first housing 110 generally includes a cylindrical shape. The first housing 110 includes a first end 502 and a second end 504. The first end 502 may correspond to the proximal end 102 of the rotating fitting 100, and extend exterior to the second housing 112 when the rotating fitting 100 is assembled. The second end 504, meanwhile, may reside within the second housing 112 when the rotating fitting 100 is assembled. As such, at least a portion of the first housing 110 is sized to reside within the second housing 112.

The first housing 110 includes a first body 506 that at least partially defines retention chambers of the rotating fitting 100. For example, the first body 506 may include a first channel 508 and a second channel 510 that annularly extends around the first housing 110 (about the longitudinal axis 106). In some instances, the first channel 508 and the second channel 510 are formed, at least in part by, an outer surface 538 of the first housing 110. The first channel 508 may define at least a portion of a first retention chamber of the rotating fitting 100, and the second channel 510 may define at least a portion of a second retention chamber of the rotating fitting 100. As discussed herein with regard to FIG. 7, bearings may at least partially reside within the first channel 508 and the second channel 510.

The first channel 508 and the second channel 510 are shown including a shape for accommodating ball bearings, however, other shapes are envisioned. As illustrated, for example, the first channel 508 and the second channel 510 include a half-spherical shape. However, the first channel 508 and/or the second channel 510 may include shapes for accommodating roller bearings. The first channel 508 and the second channel 510 are shown spaced away from one another, in a direction along the longitudinal axis 106. In some instances, the first channel 508 and the second channel 510 may be spaced apart from one another by a distance that is less than or greater than that shown in FIG. 5. Moreover, the first body 506 may define additional or fewer channels than shown. The first body 506 is further showing defining a flange 512 at the second end 504. The flange 512 may at least partially engage the gasket 500 to seat the gasket 500 between the first housing 110 and the plug 300. The flange 512 extends from the first housing 110, outwardly, and has an outer diameter for receiving the gasket 500.

The second housing 112 generally includes a cylindrical shape or a cylindrical outer surface. The second housing 112 includes a first end 514 and a second end 516. The first end 514 may provide an opening 536 for receiving the first housing 110. As such, at least a portion of the second housing 112 is sized to receive the first housing 110. That is, when assembled, at least a portion of the first housing 110 is disposed adjacent to a substantially cylindrical interior surface 518 of the second housing 112. For example, an outer wall of the first housing 110 resides within at least a portion of an inner wall of the second housing 112. The second end 516, meanwhile, may correspond to the distal end 104 of the rotating fitting 100 and couple to the supply line.

The second housing 112 includes a second body 520 that at least partially defines retention chambers of the rotating fitting 100. For example, the second body 520 may include a third channel 522 and a fourth channel 524 that are annularly formed with the second housing 112 about the longitudinal axis 106. In other words, the third channel 522 and the fourth channel are formed by the interior surface 518. The third channel 522 may define at least a portion of the first retention chamber of the rotating fitting 100, and the fourth channel 524 may define at least a portion of the second retention chamber of the rotating fitting 100. The third channel 522 and the fourth channel 524 are shown including a half-spherical shape for accommodating ball bearings, however, other shapes are envisioned. In some instances, the third channel 522 and the fourth channel 524 may be spaced apart from one another by a distance that is less than or greater than shown in FIG. 5. Moreover, the second body 520 may define additional or fewer channels than shown. When assembled, the first channel 508 and the third channel 522 may align to define the first retention chamber within which bearings reside. Additionally, the second channel 510 and the fourth channel 524 may align to define the second retention chamber within which bearings reside.

The first fastener 200(1) and the second fastener 200(2) couple to the second housing 112. The first fastener 200(1) assists in securing bearings within the first retention chamber when the rotating fitting 100 is assembled. Similarly, the second fastener 200(1) assists in securing bearings within the second retention chamber when the rotating fitting 100 is assembled. Although the first housing 110 and the second housing 112 are shown including two channels for forming portion of the first retention chamber and the second retention chamber, the rotating fitting 100 may include more than or less than two retention chambers. For example, the first housing 110 and the second housing 112 may include a single channel for accommodating bearings, and form a single retention chamber of the rotating fitting 100. In some instances, additional retention chambers may be added to increase an amount of pressure the rotating fitting 100 is configured to withstand. For example, when the rotating fitting 100 is pressurized, a shear force is exerted on the bearings. Being as the bearings are at least partially disposed in the first housing 110 and the second housing 112, the bearings resist the shear force and separation of the first housing 110 and the second housing 112.

The plug 300 is shown including a first end 526 and a second end 528. The first end 526 may thread into the second end 504 of the first housing 110. The second end 528 may include the hexagonal head to allow the plug 300 to be fastened to and unfastened from the first housing 110 (via inserting a hexagonal socket into the second end 516 of the second housing 112). The plug 300 further includes a flange 530 to seat the gasket 500 between the first housing 110 and the plug 300. For example, the gasket 500 is shown including a ring shape. When the rotating fitting 100 is assembled, the gasket 500 resides between the first housing 110 and the plug 300. Here, an interior surface 532 of the gasket 500 may engage (e.g., abut, rest, etc.) the flange 512 of the first housing 110 and the flange 530 of the plug 300. An exterior surface 534 of the gasket 500 may engage with the interior surface 518 of the second housing 112. Additionally, the gasket 500 is configured to compress between the plug 300 and the first housing 110 to maintain a high temperature and pressure seal. As the gasket 500 is compressed axially (in a direction along the longitudinal axis 106), the gasket 500 expands radially (in a direction transverse to the longitudinal axis 106) to form a seal between the first housing 110 and the second housing 112.

The first housing 110, the second housing 112, the plug 300, and the gasket 500 are manufactured from materials capable of withstanding temperatures and pressures experienced by the rotating fitting 100. The materials may be corrosion resistant given the high temperatures and pressures experienced by the rotating fitting 100. For example, in some instances, the first housing 110, the second housing 112, and/or the plug 300 are manufactured from stainless steel (e.g., 303, 304, etc.), nickel-chrome-based alloys (e.g., Inconels), nickel-alloys (e.g., hastelloy), and so forth. In some instances, the first housing 110, the second housing 112, and/or the plug 300 are manufactured from different materials to prevent seizing of the rotating fitting 100. For example, given that the plug 300 may contact the interior surface 518 of the second housing 112, the plug 300 may be formed of a first material (e.g., 303 stainless steel) and the second housing 112 may be formed of a second material (e.g., 304 stainless steel). The different materials may prevent a binding between the plug 300 and the second housing 112. The gasket 500 may be manufactured from graphite, carbon, Teflon, composites, and so forth. The gasket 500 may be a compressible material such that when the plug 300 is tightened onto the first housing 110, the gasket 500 radially expands to contact and form a seal against the second housing 112.

The rotating fitting 100 therefore includes components that, when assembled, are capable of withstanding increased temperatures and pressures. For example, bearings residing within the retention chambers of the rotating fitting 100 serve to couple the first housing 110 and the second housing 112 together, and form a rotatable coupling between the first housing 110 and the second housing 112. Further, the gasket 500 seals against the interior surface 518 of the second housing 112 to prevent an egress of the gases from the rotating fitting 100.

Figure 6:
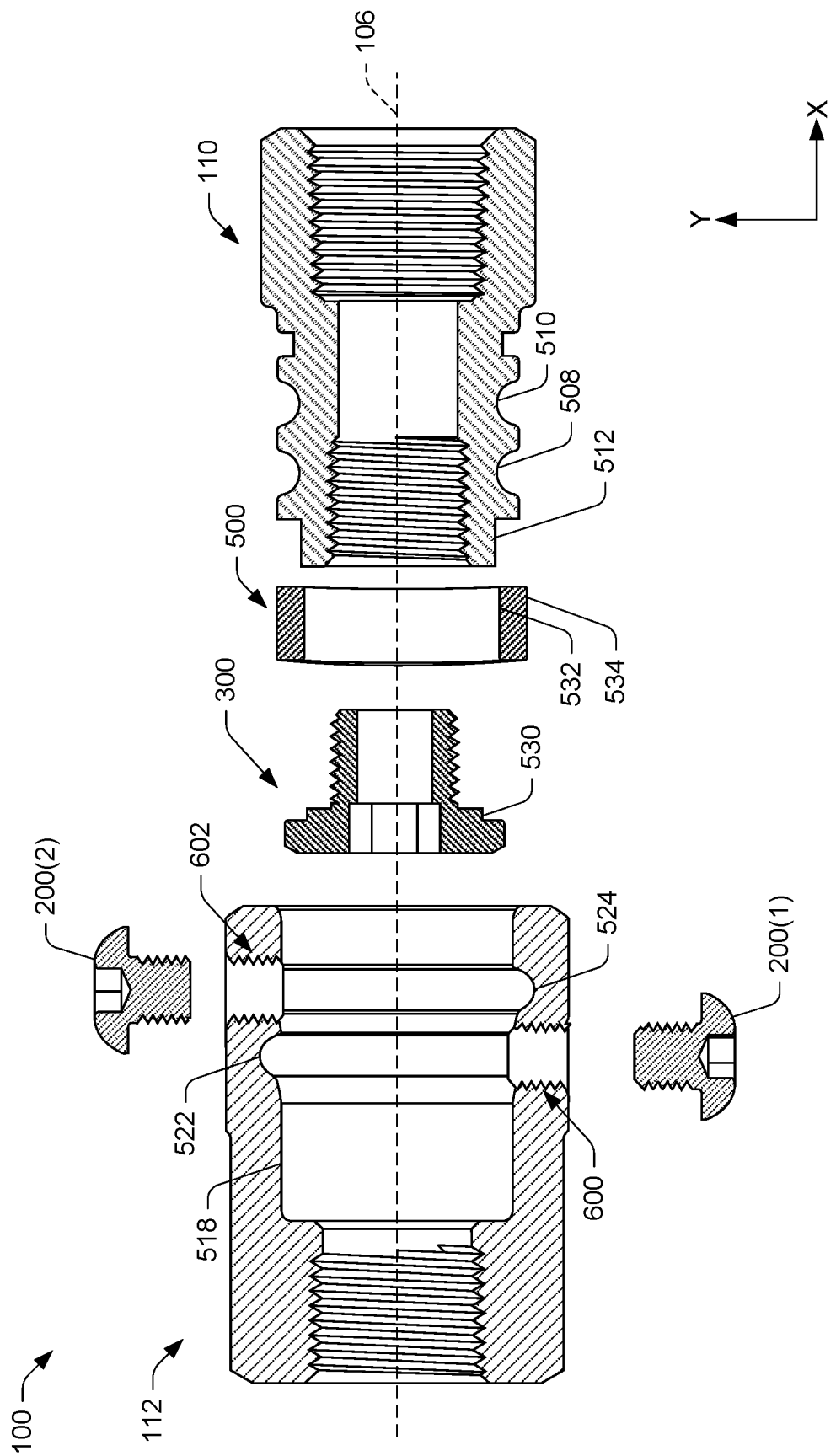
FIG. 6 illustrates an exploded cross-sectional view of the first rotating fitting of FIG. 1, taken along line A-A of FIG. 3, according to an embodiment of the present disclosure.

FIG. 6 illustrates an exploded view of the rotating fitting 100. Additionally, FIG. 6 illustrates a cross-sectional view of the rotating fitting 100, or components of the rotating fitting 100, taken along line A-A of FIG. 3.

During assembly of the rotating fitting 100, the gasket 500 may be placed over the flange 512 of the first housing 110 and the flange 530 of the plug 300. For example, the gasket 500 is slid over the flange 512 of the first housing 110 (at the second end 504). As discussed above, the plug 300 includes threads that correspondingly engage with threads formed within the first housing 110. Tightening the plug 300 onto the first housing 110 secures the gasket 500 between the first housing 110 and the plug 300. After assembling the first housing 110, the plug 300, and the gasket 500, such assembly (e.g., the first housing 110, the plug 300, and the gasket 500) is inserted into the second housing 112. Alternatively, the second housing 112 may slide over the first housing 110, the plug 300, and the gasket 500.

As the first housing 110 enters the second housing 112 (e.g., in the X-direction), bearings are placed (e.g., fed) into the first channel 508, the second channel 510, the third channel 522, and the fourth channel 524. For example, the first fastener 200(1) and the second fastener 200(2) are removed from the second housing 112. As the first housing 110 advances into the second housing 112, the first channel 508 and the third channel 522 become aligned (Y-plane). Additionally, the second channel 510 and the fourth channel 524 become aligned (Y-plane). Introduced above with regard to FIG. 5, and as shown in FIG. 7, the first channel 508 and the third channel 522 form a first retention chamber for first bearings, while the second channel 510 and the fourth channel 524 form a second retention chamber for second bearings.

In FIG. 6, the first fastener 200(1) and the second fastener 200(2) are shown uncoupled from the second housing 112. By removing the first fastener 200(1) and the second fastener 200(2), bearings are fed through a first port 600 and a second port 602, respectively. That is, the first port 600 and the second port 602 provide access to the retention chambers such that bearings may be placed within the first channel 508, the second channel 510, the third channel 522, and the fourth channel 524, respectively. As bearings are supplied, the bearings begin to occupy the first channel 508, the second channel 510, the third channel 522, and the fourth channel 524. Upon filling of the first channel 508, the second channel 510, the third channel 522, and the fourth channel 524, the first fastener 200(1) and the second fastener 200(2) are coupled to the second housing 112. For example, the first fastener 200(1) threads into the first port 600 and the second fastener 200(2) threads into the second port 602. The fastening of the first fastener 200(1) and the second fastener 200(2) secure the bearings within the first channel 508, the second channel 510, the third channel 522, and the fourth channel 524. As shown, the first port 600 and the second port 602 extend through a thickness, or wall, of the second housing 112, from an outer surface to the interior surface 518.

Additionally, when the first fastener 200(1) and the second fastener 200(2) couple to the second housing 112, the first fastener 200(1) and the second fastener 200(2) may occupy at least a portion of the first channel 508, the second channel 510, the third channel 522, and/or the fourth channel 524, respectively. In such instances, the first channel 508, the second channel 510, the third channel 522, and the fourth channel 524 may be void of bearings directly beneath the first port 600 and the second port 602, respectively, thereby allowing the first fastener 200(1) and the second fastener 200(2) to couple to the second housing 112. Given this design, the bearings may remain stationary within the first channel 508, the second channel 510, the third channel 522, and the fourth channel 524 as the first housing 110 rotates. However, the bearings are permitted to rotate about their respective axes.

The bearings within the first channel 508, the second channel 510, the third channel 522, and the fourth channel 524 couple the first housing 110 and the second housing 112 together. That is, once the bearings are inserted into the first channel 508, the second channel 510, the third channel 522, and the fourth channel 524, the bearings prevent the separation of the first housing 110 and the second housing 112 (in the X-direction). More particularly, being as bearings are disposed within the first channel 508 and the third channel 522, the bearings serve to prevent separation of the first housing 110 and the second housing 112. Additionally, being as bearings are disposed within the second channel 510 and the fourth channel 524, the bearings serve to prevent separation of the first housing 110 and the second housing 112. In other words, during pressurizing of the rotating fitting 100, a shear force is exerted on the bearings. However, being as the bearings engage with the first housing 110 and the second housing 112, the bearings resist the shear force and separation of the first housing 110 and the second housing 112. The rotating fitting 100 therefore includes components for coupling the first housing 110 and the second housing 112. The coupling may come by way of bearings that are disposed in channels of the first housing 110 and the second housing 112, respectively. Moreover, the bearings permit rotation of the first housing 110 to provide rotational movement of the spray gun, for example, coupled to the first housing 110. The gasket 500 further seals the first housing 110 and the second housing 112 to prevent leakages and a loss of pressure within the rotating fitting 100.

Figure 7:
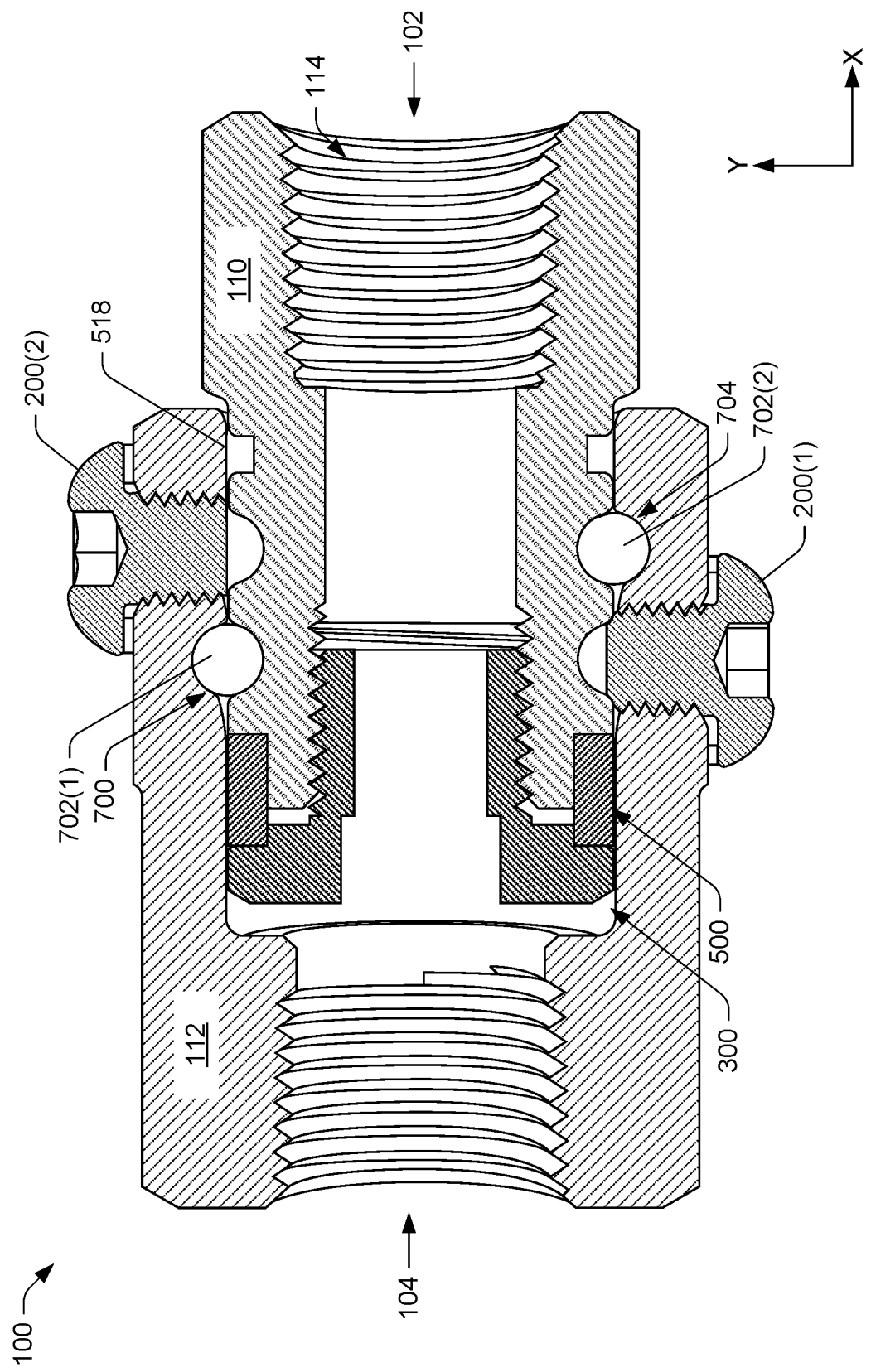
FIG. 7 illustrates a cross-sectional view of the first rotating fitting of FIG. 1, taken along line A-A of FIG. 3, according to an embodiment of the present disclosure.

FIG. 7 illustrates an assembled cross-sectional view of the rotating fitting 100, taken along line A-A of FIG. 3. The first housing 110 is shown at least partially disposed within the second housing 112. Moreover, as explained above with regard to FIG. 6, when the first housing 110 is placed within the second housing 112, the first channel 508 and the third channel 522 form a first retention chamber 700. First bearings 702(1) reside within the first retention chamber 700 and couple the first housing 110 and the second housing 112. That is, the first bearings 702(1) resist longitudinal movement (X-direction) of the first housing 110 and the second housing 112 relative to one another. When the first housing 110 and the second housing 112 are coupled together, the first bearings 702(1) resist a shear force applied from the pressure experienced by the rotating fitting 100. Similarly, when the first housing 110 is placed within the second housing 112, the second channel 510 and the third channel 522 form a second retention chamber 704. Second bearings 702(2) reside within the second retention chamber 704 and couple the first housing 110 and the second housing 112. The second bearings 702(2) resist longitudinal movement (X-direction) of the first housing 110 and the second housing 112 relative to one another. When the first housing 110 and the second housing 112 are coupled together, the first bearings 702(1) resist a shear force applied from the pressure experienced by the rotating fitting 100.

In some instances, the first channel 508 may receive substantially half of individual bearings of the first bearings 702(1), and the third channel 522 may receive substantially half of the individual bearings of the first bearings 702(1). Additionally, the second channel 510 may receive substantially half of individual bearings of the second bearings 702(2), and the fourth channel 524 may receive substantially half of the individual bearings of the second bearings 702(2). However, equal portions of the first bearings 702(1) need not reside in the first channel 508 and the third channel 522, and/or equal portions of the second bearings 702(2) need not reside in the second channel 510 and the fourth channel 524. In such instances, the first channel 508 and the second channel 510 may include a greater or lesser depth in the first body 506 of the first housing 110, and/or the third channel 522 and the fourth channel 524 may include a greater or lesser depth in the second body 520 of the second housing 112. For example, the first body 506 may form greater than half of the first channel 508 and/or the second channel 510, and/or the second body 520 may form greater than half of the third channel 522 and/or the fourth channel 524.

Additionally, although the first retention chamber 700 and the second retention chamber 704 are shown being semi-circular in shape, other shapes are envisioned for accommodating differently shaped bearings (e.g., roller bearings, tapered bearings, etc.). As also shown, the first fastener 200(1) is at least partially disposed within the first retention chamber 700 (or a portion of the first channel 508 and/or the third channel 522), and the second fastener 200(2) is at least partially disposed within the second retention chamber 704 (or a portion of the second channel 510 and/or the fourth channel 524). Such design prevents the first bearings 702(1) and the second bearings 702(2) annularly rotating about the first retention chamber 700 and the second retention chamber 704, respectively.

The gasket 500 is shown disposed between the first housing 110 and the plug 300. The interior surface 532 of the gasket 500 engages with the flange 512 of the first housing 110 and the flange 530 of the plug 300. The exterior surface 534 of the of the gasket 500 engages with the interior surface 518 of the second housing 112. As the first housing 110 rotates, the gasket 500 engages with the interior surface 518 of the second housing 112 to provide a seal between the first housing 110 and the second housing 112. In some instances, tightening the plug 300 compresses the gasket 500 against the interior surface 518 of the second housing 112. For example, as the plug 300 is tightened, the gasket 500 is compressed between the plug 300 and the first housing 110. This compression may result in the gasket 500 applying a force against the interior surface 518 of the second housing 112. As the gasket 500 experiences wear, the plug 300 may be tightened to further secure the gasket 500 and seal the gasket 500 with the second housing 112. For example, a hexagonal socket maybe placed through the distal end 104 of the rotating fitting 100 and engaged with the hexagonal head of the plug 300.

In some instances, edges or surfaces of the first housing 110 and/or the second housing 112 may be chamfered or rounded to prevent damage to the gasket 500. For example, as the gasket 500 is inserted into the second housing 112, edges of the first port 600 and/or the second port 602, for example, may be chamfered to prevent damage to the gasket 500. After assembly, the first housing 110, the second housing 112, and the plug 300 form the passage 114 of the rotating fitting 100, and the passage 114 extends from the proximal end 102 to the distal end 104.

Although the proximal end 102 and the distal end 104 of the rotating fitting 100 are shown including certain receptacles for receiving the spray gun and supply line, respectively, the receptacles may be differently shaped than shown and/or attachments may couple to the proximal end 102 and the distal end 104. For example, a 90 degree or 45 degree elbow may couple to the proximal end 102 and/or the distal end 104 of the rotating fitting 100. Additionally, although the rotating fitting 100 is shown including two retention chambers, the rotating fitting 100 may include more than or less than two retention chambers. The first retention chamber 700 and the second retention chamber 704, may also be spaced apart from one another differently than shown (e.g., spaced closer to one another or spaced farther from one another). Additionally, the proximal end 102 is shown including a receptacle (e.g., slot) for receiving the spray gun and the distal end 104 is shown including a receptacle (e.g., threads) for receiving the supply line. As shown, the receptacles may be located within an interior of the rotating fitting 100.

The rotating fitting 100 therefore permits rotation of the first housing 110 inside the second housing 112. Additionally, the first bearings 702(1) and the second bearings 702(2) engage with the first retention chamber 700 and the second retention chamber 704, respectively, formed within the first housing 110 and the second housing 112. The first bearings 702(1) and the second bearings 702(2) resist separation of the first housing 110 and the second housing 112 as the rotating fitting 100 experiences pressures associated with metal spray processes (e.g., 1200 PSI). Further, the first bearings 702(1) and the second bearings 702(2) provide rotational movement to the first housing 110, which is coupled to a spray gun, for example, to reduce movement being imparted to a supply line coupled to the second housing 112.

Figure 8:
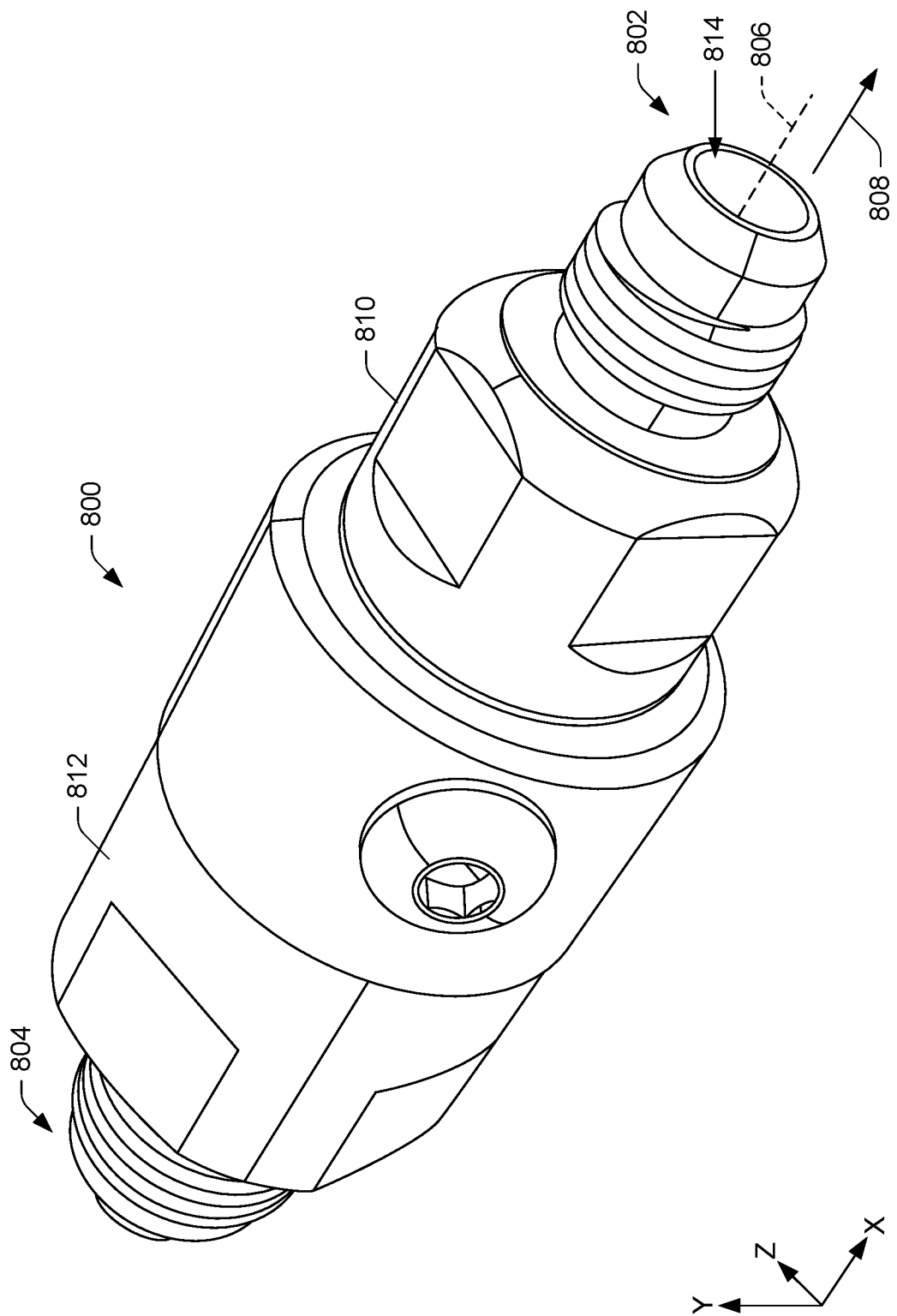
FIG. 8 illustrates a perspective view of an example second rotating fitting, according to an embodiment of the present disclosure.

FIG. 8 illustrates a perspective view of an example rotating fitting 800. Compared to the rotating fitting 100 as discussed above with regard to FIGS. 1-7, the rotating fitting 800 may include components for attaching to a supply line and a spray gun on an exterior of the rotating fitting 800. That is, the rotating fitting 800 may include threads, for example, located on an exterior of the rotating fitting 800. Locating the threads on an exterior of the rotating fitting 800 may allow the supply line and the spray gun to be conveniently secured to the rotating fitting 800 and/or may reduce debris, soot, and so forth accumulating on threads disposed within the interior (as compared to the rotating fitting 100).

The rotating fitting 800 may find use in high-pressure metal spray processes to remanufacture parts. However, the concepts discussed herein are not limited to such applications, and the rotating fitting 800 may find use in other fields and/or for other purposes. The rotating fitting 800 is shown including a substantially cylindrical shape, however, other shapes are envisioned (e.g., rectangular, hexagonal, etc.).

The rotating fitting 800 includes a proximal end 802, and a distal end 804 opposite the proximal end 802. The proximal end 802 is spaced apart in a direction along a longitudinal axis 806 of the rotating fitting 800 (e.g., in the X-direction shown in FIG. 8). The proximal end 802 is configured to fluidly connect with and/or otherwise couple to a spray gun (not shown) or other nozzle for dispensing the gases. The proximal end 802 may include threads or other male/female connectors for coupling to the spray gun, for example. As shown and as introduced above, such threads may be located on an exterior of the rotating fitting 800. The distal end 804 may couple to a supply line (not shown) for receiving the gases. The distal end 804 may include threads or other male/female connectors for coupling to the supply line, which may be located on an exterior of the rotating fitting 800. As such, the gases are dispersed out of the proximal end 802 in a flow direction 808. The flow direction 808 is substantially parallel to the longitudinal axis 806 of the rotating fitting 800.

In some instances, the rotating fitting 800 is formed via two housings that operably couple to one another. For example, the rotating fitting 800 may be formed at least in part by a first housing 810 and a second housing 812. The first housing 810 is shown disposed at the proximal end 802, while the second housing 812 is shown disposed at the distal end 804. The first housing 810 represents an inner housing that nestles at least partially within the second housing 812. Stated alternatively, the second housing 812 may receive or enclose at least part of the first housing 810.

In some instances, the first housing 810 represents a portion of the rotating fitting 800 that rotates during use (e.g., about the X-axis), whereas the second housing 812 represents a portion of the rotating fitting 800 that remains fixed (e.g., stationary) during use. As such, the first housing 810 may rotate within the second housing 812 (e.g., clockwise or counterclockwise about the longitudinal axis 806). As discussed herein in regard to FIGS. 13 and 14, the first housing 810 and the second housing 812 define, or form, a passage 814 that extends through the rotating fitting 800 for channeling the gases out the proximal end 802. Additionally, as will be discussed in FIGS. 13 and 14, the first housing 810 and the second housing 812 may rotatably couple to one another via ball bearings, fasteners, and so forth. Such coupling may secure the first housing 810 within the second housing 812, and permit the rotational movement of the first housing 810. However, although the first housing 810 is discussed as rotating within the second housing 812, in some instances, the first housing 810 may represent a portion of the rotating fitting 800 that remains fixed and the second housing 812 may represent a portion of the rotating fitting 800 that rotates.

The rotating fitting 800 reduces, or eliminates, fatigue and failure in supply lines. For example, the rotating fitting 800 permits the spray gun, nozzle, and so forth to rotate while keeping the supply line fixed. In other words, the rotating fitting 800 allows for the spray gun to rotate without transferring such movement to the supply line. In doing so, the rotating fitting 800 reduces, or eliminates, fatigue in the supply line.

Figure 9:
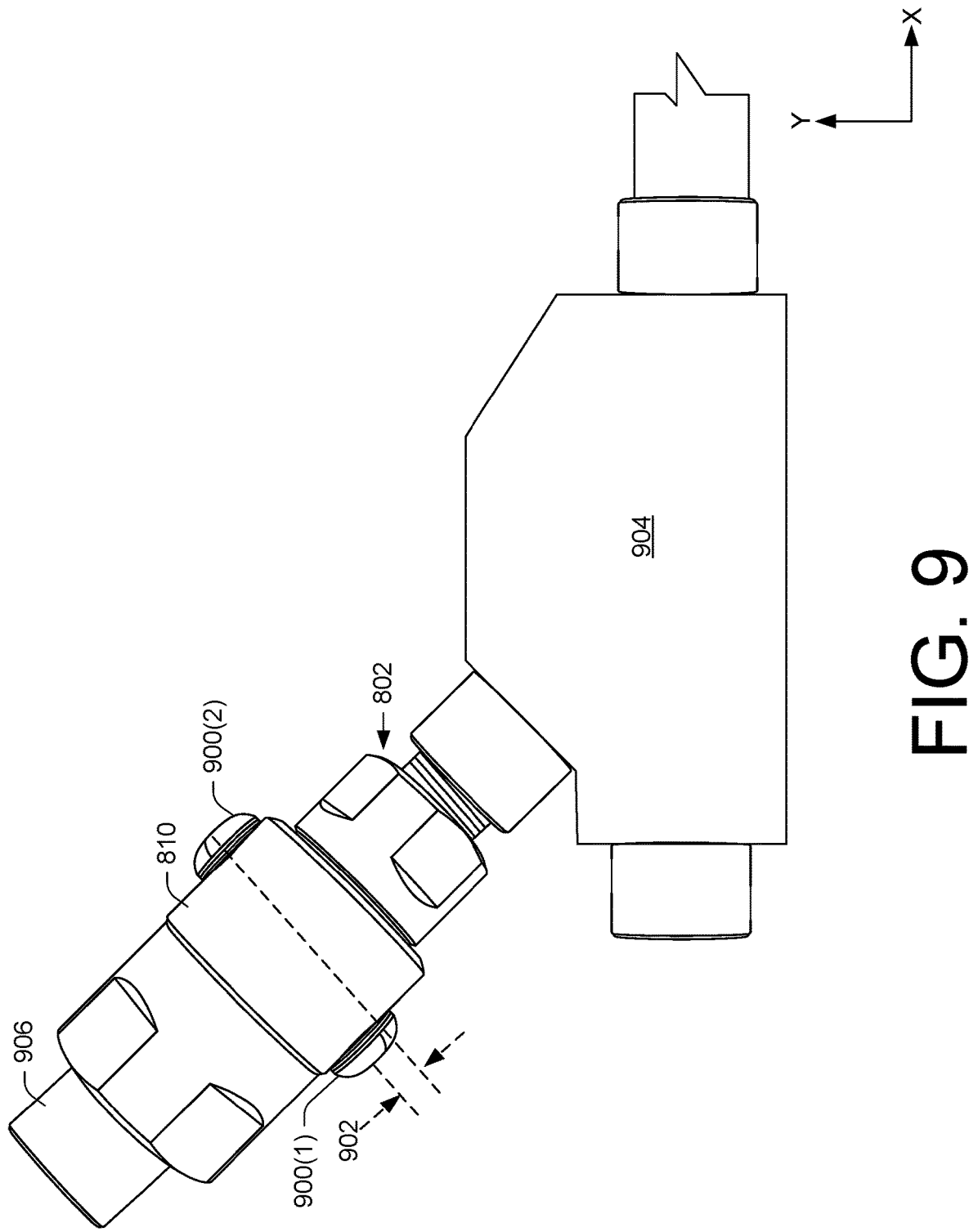
FIG. 9 illustrates a side view of the second rotating fitting of FIG. 8, according to an embodiment of the present disclosure.

FIG. 9 illustrates a side view of the rotating fitting 800. As introduced above, the rotating fitting 800 includes the first housing 810 rotatably coupled to the second housing 812. The first housing 810 couples to the spray gun, at the proximal end 802, while the second housing 812 couples to a supply line at the distal end 804 for receiving the gases.

The rotating fitting 800 is shown including two fasteners 900, such as a first fastener 900(1) and a second fastener 900(2) coupled to the second housing 812. As discussed herein in relation to FIGS. 12-14, the fasteners 900 may provide access to channels, grooves, or retention chambers within which bearings reside. For example, removing the fasteners 900 from the second housing 812 may expose respective retention chambers formed at least in part by the first housing 810 and the second housing 812. When removed, bearings (e.g., ball bearings, cylindrical bearings, tapered bearings, etc.) may be placed through sockets, passages, or ports within which the first fastener 900(1) and the second fastener 900(2) engage. Therein, the bearings may enter the retention chambers, respectively, for coupling the first housing 810 and the second housing 812 together, as well as providing the rotational movement of the rotating fitting 800. In some instances, the fasteners 900 may represent hexagonal screws that are threaded within the second housing 812.

The first fastener 900(1) and the second fastener 900(2) are shown spaced apart in a direction along the longitudinal axis 806 by a distance 902 (X-direction). The distance 902 may represent a distance disposed between a centerline of the retention chambers formed in the first housing 810 and the second housing 812. In other words, the bearings within the retention chambers, which are spaced apart by the distance 902, may create two regions, areas, zones, or points of contact between the first housing 810 and the second housing 812. The two points of contact securely couple the first housing 810 and the second housing 812 together, and allows the rotating fitting 800 to endure high pressures (e.g., between 400 PSI and 1200 PSI).

The proximal end 802 and the distal end 804 (or respective portions of the first housing 810 and the second housing 812) may include fittings or fixtures that accept wrenches, tools, and so forth. Such fixtures assist in tightening the rotating fitting 800 to the spray gun and/or supply line.

As further shown in FIG. 9, the rotating fitting 800 couples at the proximal end 802 to a spray gun 904. The distal end 804 couples to a supply line 906 for receiving heated gas. The spray gun 904 further couples to other lines, such as a line that supplies powdered metal. Within the spray gun 904 the heated gas and the powdered metal may mix for being dispersed out of the spray gun 904.

The rotating fitting 800 therefore includes components, such as the fasteners 900, that assist in coupling the first housing 810 and the second housing 812 together. Such coupling may come by way of bearings that reside within retention chambers of the first housing 810 and the second housing 812. Moreover, the use of bearings provides rotating movement and reduces the amount of motion imparted to the supply line.

Figure 10:
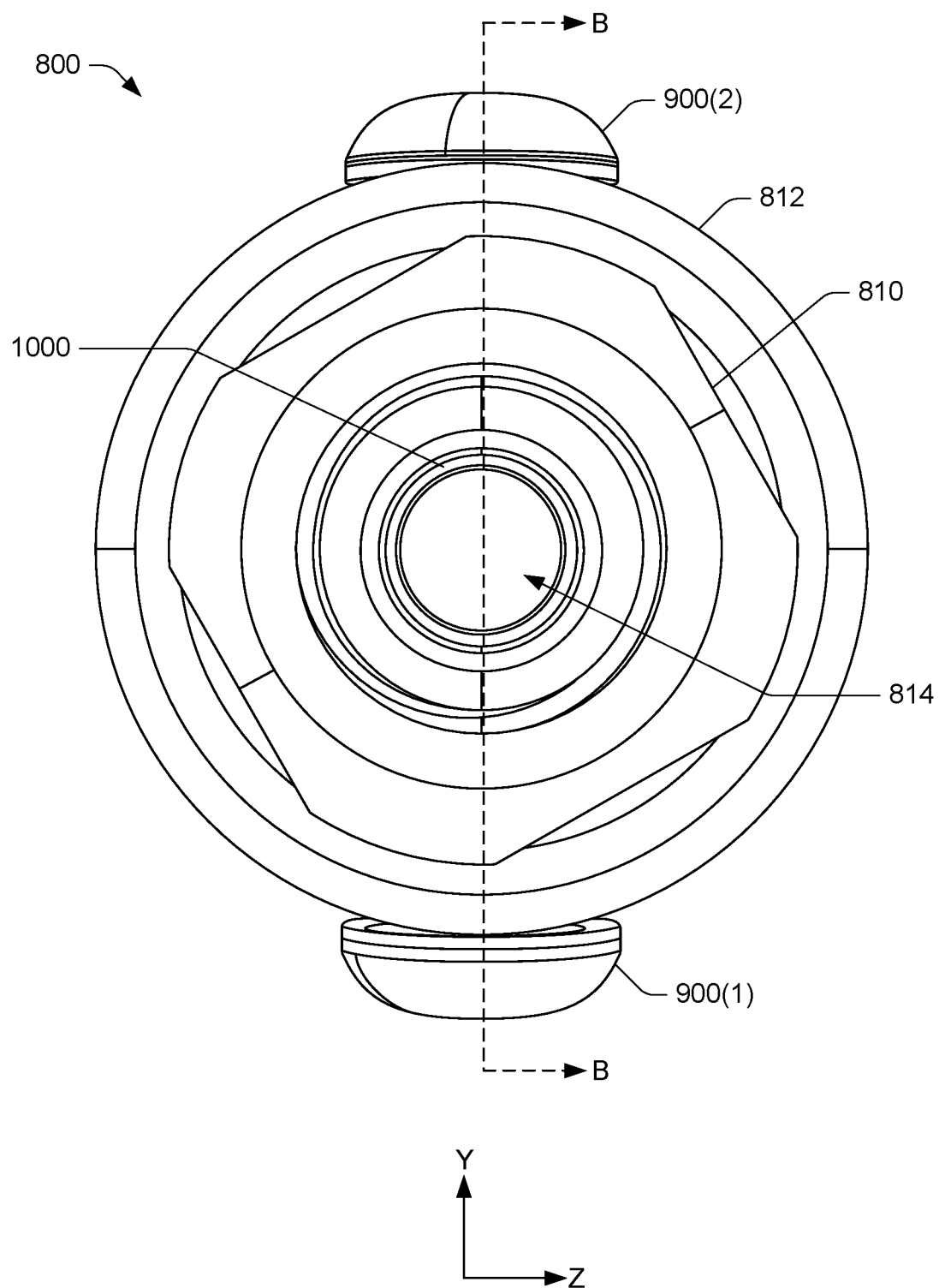
FIG. 10 illustrates a first end view of the second rotating fitting of FIG. 8, according to an embodiment of the present disclosure.

FIG. 10 illustrates an end view of the rotating fitting 800. The view shown in FIG. 10 represents a planar view of the proximal end 802, looking down into the passage 814 of the rotating fitting 800 towards the distal end 804. The passage 814, as noted above, is defined at least in part by the first housing 810 and the second housing 812, and may span a longitudinal length of the rotating fitting 800 (X-direction).

As shown in FIG. 10, but as will be discussed in more detail with regard to FIGS. 12-14, the rotating fitting 800 includes a plug 1000 that couples to the first housing 810. The plug 1000 may form a portion of the passage 814 and may be disposed at least partially between the first housing 810 and the second housing 812 (within the rotating fitting 800). The plug 1000 serves to secure a gasket within the rotating fitting 800. The gasket seals the first housing 810 and the second housing 812 together. During rotation of the first housing 810, the plug 1000 correspondingly rotates with the first housing 810.

The first fastener 900(1) and the second fastener 900(2) are shown being aligned along a similar plane (Y-plane), or on opposing sides of the second housing 812. In some instances, the first fastener 900(1) and the second fastener 900(2) may be disposed at other locations on the second housing 812, closer to one another, and/or on different planes.

FIG. 10 further illustrates a line B-B that extends through the rotating fitting 800. Details of a cross-sectional view of the rotating fitting 800, taken along line B-B, are discussed herein with regard to FIGS. 13 and 14.

The first housing 810, the second housing 812, and the plug 1000 therefore define the passage 814 through which the gases travel, from the distal end 804 to the proximal end 802. The plug 1000, as will be discussed in further detail herein, further assists in sealing the first housing 810 and the second housing 812 together, preventing leakage of the gases between the first housing 810 and the second housing 812.

Figure 11:
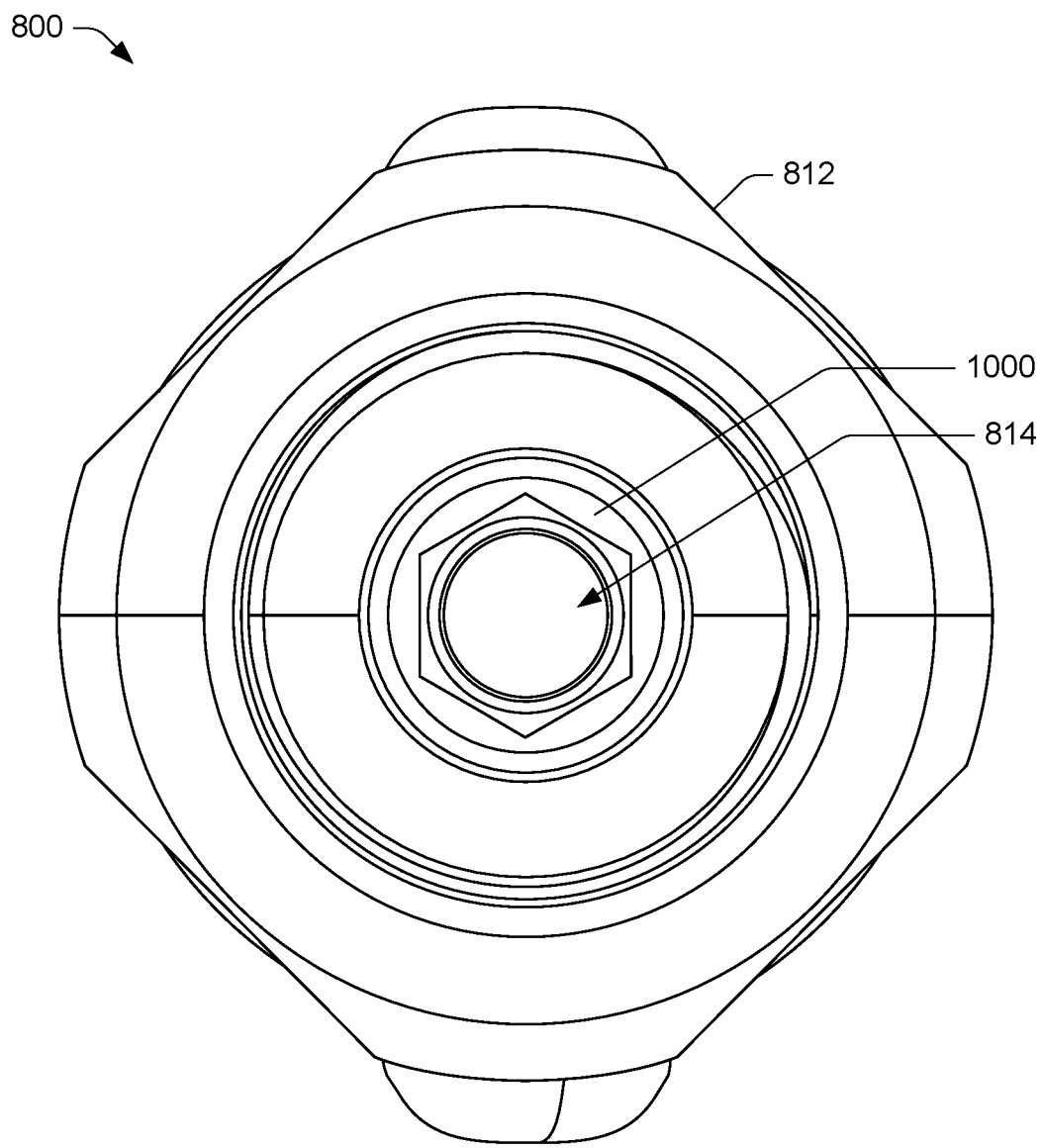
FIG. 11 illustrates a second end view of the second rotating fitting of FIG. 8, according to an embodiment of the present disclosure.

FIG. 11 illustrates an end view of the rotating fitting 800. The view shown in FIG. 11 represents a planar view of the distal end 804, looking into the passage 814 of the rotating fitting 800 towards the proximal end 802. The passage 814, as noted above, is defined at least in part by the first housing 810 and the second housing 812, and may span a longitudinal length of the rotating fitting 800 (X-direction).

As introduced above in FIG. 10, the rotating fitting 800 includes the plug 1000 that couples to the first housing 810. The plug 1000 secures a gasket within the rotating fitting 800, to create a seal between the first housing 810 and the second housing 812. The plug 1000 is shown including a hexagonal head for coupling the plug 1000 to the first housing 810. In some instances, the plug 1000 is tightened after use of the rotating fitting 800 and/or as the gasket becomes worn. For example, further tightening of the plug (e.g., via a hexagonal socket), may compress the gasket between the plug 1000 and the first housing 810. This compression may increase the seal between the first housing 810 and the second housing 812.

Therefore, in FIG. 4, the plug 1000 is used to secure the gasket within the rotating fitting 800. After a prolonged use of the rotating fitting 800, as the gasket becomes worn or in need of replacement, the plug 1000 may be further tightened to increase a seal between the first housing 810 and the second housing 812, and/or may be uncoupled from the first housing 810. The plug 1000 therefore permits maintenance of the rotating fitting 800 in a convenient manner.

Figure 12:
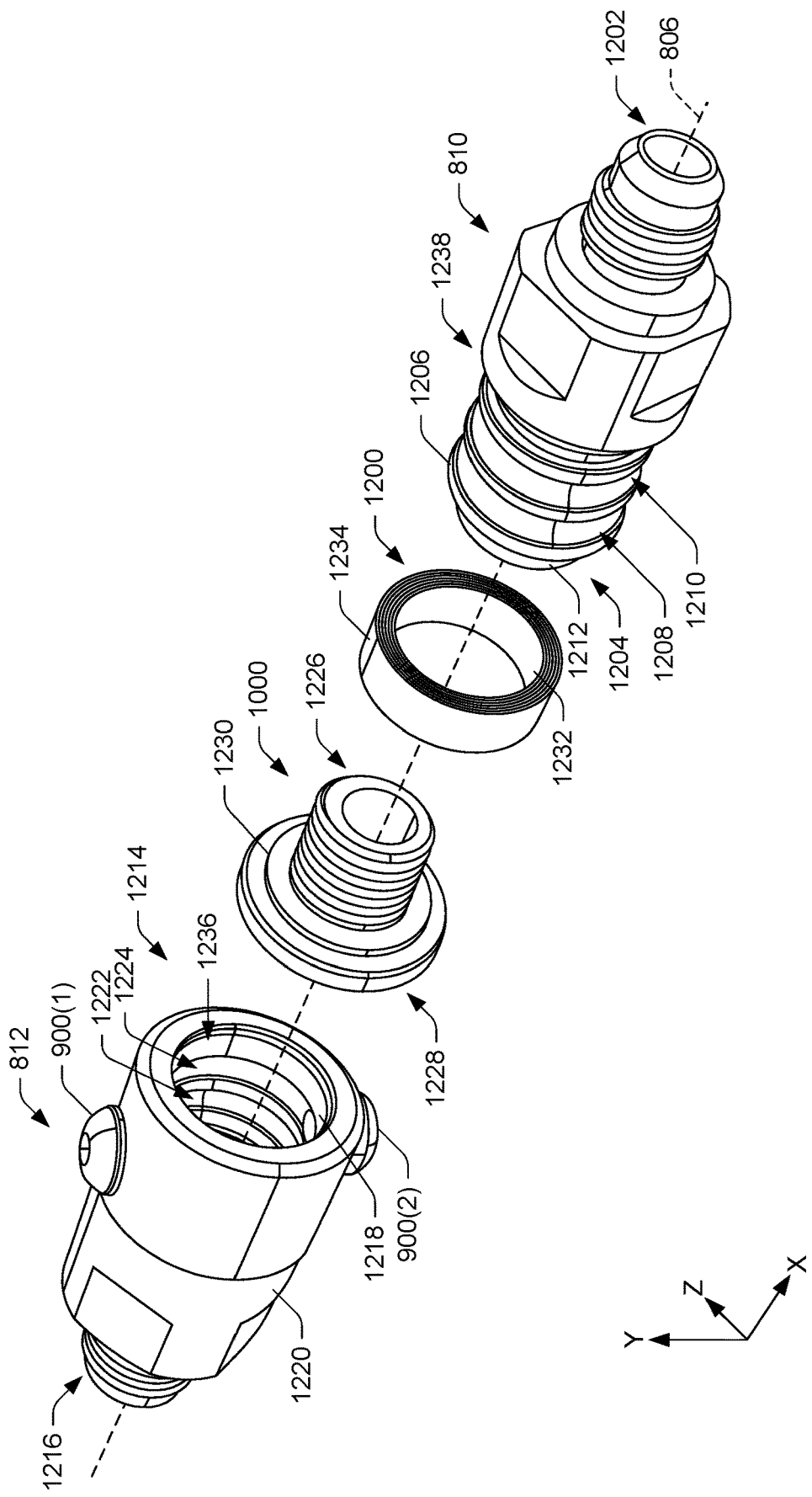
FIG. 12 illustrates an exploded view of the second rotating fitting of FIG. 8, according to an embodiment of the present disclosure.

FIG. 12 illustrates an exploded view of the rotating fitting 800, showing the first housing 810, the second housing 812, the plug 1000, and a gasket 1200. The first housing 810 generally includes a cylindrical shape. The first housing 810 includes a first end 1202 and a second end 1204. The first end 1202 may correspond to the proximal end 802 of the rotating fitting 800, and extend exterior to the second housing 812 when the rotating fitting 800 is assembled. The second end 1204, meanwhile, may reside within the second housing 812 when the rotating fitting 800 is assembled. As such, at least a portion of the first housing 810 is sized to reside within the second housing 812.

The first housing 810 includes a first body 1206 that at least partially defines retention chambers of the rotating fitting 800. For example, the first body 1206 may include a first channel 1208 and a second channel 1210 that annularly extend around the first housing 810 (about the longitudinal axis 806). In some instances, the first channel 1208 and the second channel 1210 are formed, at least in part by, an outer surface 1238 of the first housing 810. The first channel 1208 may define at least a portion of a first retention chamber of the rotating fitting 800, and the second channel 1210 may define at least a portion of a second retention chamber of the rotating fitting 800. As discussed herein with regard to FIG. 14, bearings may at least partially reside within the first channel 1208 and the second channel 1210.

The first channel 1208 and the second channel 1210 are shown including a semi-spherical or circular shape for accommodating ball bearings, however, other shapes are envisioned. For example, the first channel 1208 and/or the second channel 1210 may include shapes for accommodating roller bearings. The first channel 1208 and the second channel 1210 are shown spaced away from one another, in a direction along the longitudinal axis 806 of the rotating fitting 800. The first body 1206 is further showing defining a flange 1212 at the second end 1204. The flange 1212 may at least partially engage the gasket 1200 to seat the gasket 1200 between the first housing 810 and the plug 1000. The flange 1212 extends from the first housing 810, outwardly, and has an outer diameter for receiving the gasket 1200.

The second housing 812 generally includes a cylindrical shape. The second housing 812 includes a first end 1214 and a second end 1216. The first end 1214 may provide an opening 1236 for receiving the first housing 810. As such, at least a portion of the second housing 812 is sized to receive the first housing 810. That is, when assembled, at least a portion of the first housing 810 is disposed adjacent to a substantially cylindrical interior surface 1218 of the second housing 812. For example, an outer wall of the first housing 810 resides within at least a portion of an inner wall of the second housing 812. The second end 1216, meanwhile, may correspond to the distal end 804 of the rotating fitting 800 and couple to the supply line.

The second housing 812 includes a second body 1220 that at least partially defines retention chambers of the rotating fitting 800. For example, the second body 1220 may include a third channel 1222 and a fourth channel 1224 that annularly extend within the second housing 812 (about the longitudinal axis 806). The third channel 1222 may define at least a portion of the first retention chamber of the rotating fitting 800, and the fourth channel 1224 may define at least a portion of the second retention chamber of the rotating fitting 800. The third channel 1222 and the fourth channel 1224 are shown including a shape for accommodating ball bearings, however, other shapes are envisioned. When assembled, the first channel 1208 and the third channel 1222 define the first retention chamber within which bearings reside. Additionally, the second channel 1210 and the fourth channel 1224 define the second retention chamber within which bearings reside.

The first fastener 900(1) and the second fastener 900(2) couple to the second housing 812. The first fastener 900(1) assists in securing bearings within the first retention chamber when the rotating fitting 800 is assembled. Similarly, the second fastener 900(2) assists in securing bearings within the second retention chamber when the rotating fitting 800 is assembled. Although the first housing 810 and the second housing 812 are shown including two channels for forming portions of the first retention chamber and the second retention chamber, the rotating fitting 800 may include more than or less than two retention chambers. For example, the first housing 810 and the second housing 812 may include a single channel for accommodating bearings, and form a single retention chamber of the rotating fitting 800. In some instances, additional retention chambers may be added to increase an amount of pressure the rotating fitting 800 is configured to withstand. For example, when the rotating fitting 800 is pressurized, a shear force is exerted on the bearings. Being as the bearings are at least partially disposed in the first housing 810 and the second housing 812, the bearings resist the shear force and separation of the first housing 810 and the second housing 812.

The plug 1000 is shown including a first end 1226 and a second end 1228. The first end 1226 may thread into the second end 1204 of the first housing 810. The second end 1228 may include the hexagonal head to allow the plug 1000 to be fastened to and unfastened from the first housing 810. The plug 1000 further includes a flange 1230 to seat the gasket 1200 between the first housing 810 and the plug 1000. For example, the gasket 1200 is shown including a ring shape. When the rotating fitting 800 is assembled, the gasket 1200 resides between the first housing 810 and the plug 1000. Here, an interior surface 1232 of the gasket 1200 may engage (e.g., abut, rest, etc.) the flange 1212 of the first housing 810 and the flange 1230 of the plug 1000. An exterior surface 1234 of the gasket 1200 may engage with the interior surface 1218 of the second housing 812.

The first housing 810, the second housing 812, the plug 1000, and the gasket 1200 may be manufactured from materials capable of withstanding temperatures and pressures experienced by the rotating fitting 800. For example, in some instances, the first housing 810 may be manufactured from stainless steel. Additionally, or alternatively, the second housing 812 may be manufactured from stainless steel. The gasket 1200 may be manufactured from graphite, carbon, Teflon, composites, and so forth.

The rotating fitting 800 therefore includes components that, when assembled, are capable of withstanding increased temperatures and pressures. For example, bearings residing within the retention chambers of the rotating fitting 800 serve to couple the first housing 810 and the second housing 812 together, and form a rotatable coupling between the first housing 810 and the second housing 812. Further, the gasket 1200 seals against the interior surface 1218 of the second housing 812 to prevent an gases.

Figure 13:
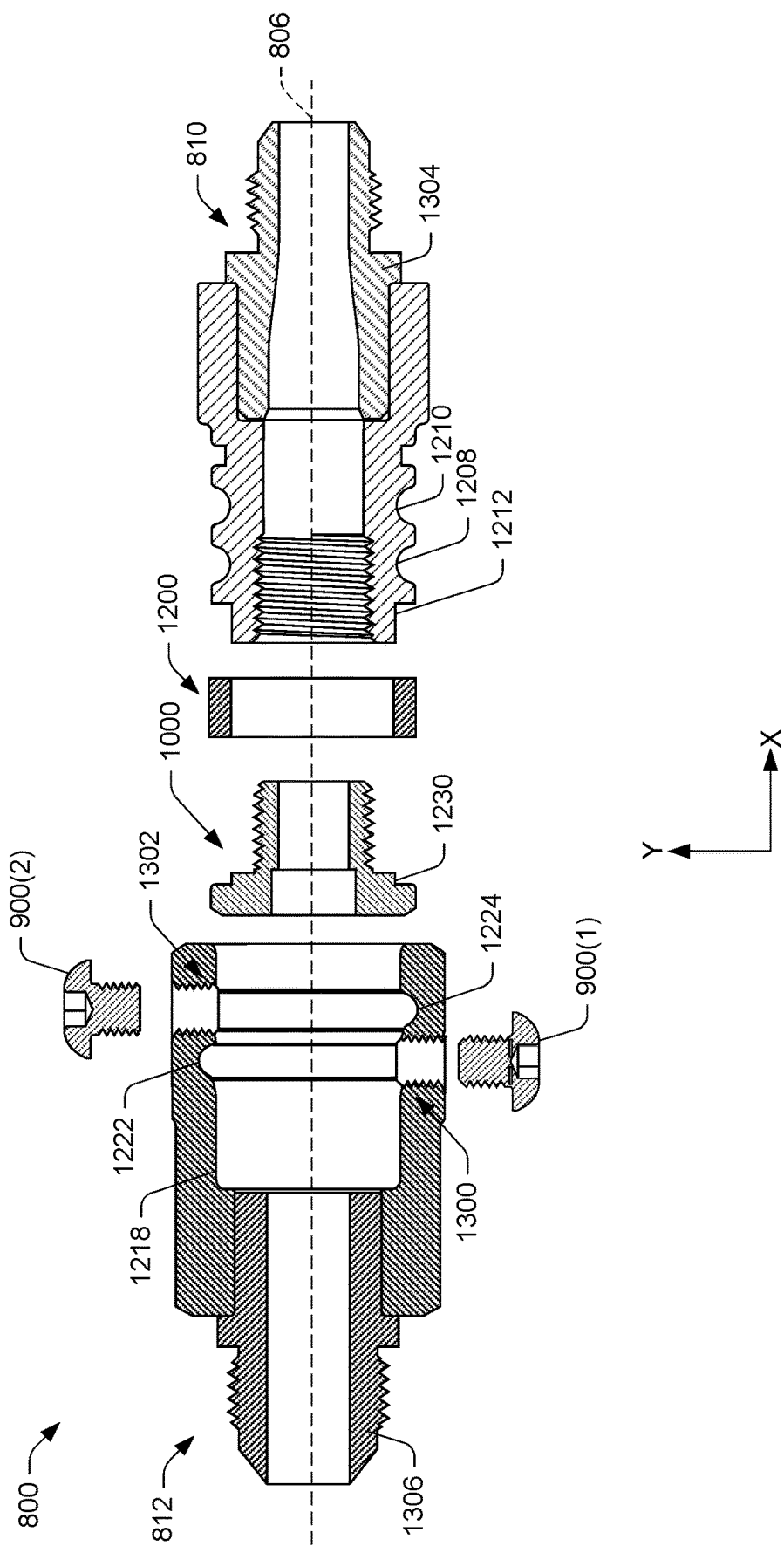
FIG. 13 illustrates an exploded cross-sectional view of the second rotating fitting of FIG. 8, taken along line B-B of FIG. 10, according to an embodiment of the present disclosure.

FIG. 13 illustrates an exploded view of the rotating fitting 800. Additionally, FIG. 13 illustrates a cross-sectional view of the rotating fitting 800, or components of the rotating fitting 800, taken along line B-B of FIG. 10.

During assembly of the rotating fitting 800, the gasket 1200 may be placed over the flange 1212 of the first housing 810 and the flange 1230 of the plug 1000. For example, the gasket 1200 is slid over the flange 1212 of the first housing 810 (at the second end 1204). As discussed above, the plug 1000 includes threads that correspondingly engage with threads formed within the first housing 810. Tightening the plug 1000 onto the first housing 810 secures the gasket 1200 between the first housing 810 and the plug 1000. After assembling the first housing 810, the plug 1000, and the gasket 1200 together, such assembly is inserted into the second housing 812. Alternatively, the second housing 812 may slide over the first housing 810, the plug 1000, and the gasket 1200.

As the first housing 810 enters the second housing 812 (e.g., in the X-direction), bearings are placed (e.g., fed) into the first channel 1208, the second channel 1210, the third channel 1222, and the fourth channel 1224. For example, the first fastener 900(1) and the second fastener 900(2) are removed from the second housing 812. As the first housing 810 advances into the second housing 812, the first channel 1208 and the third channel 1222 become aligned (Y-plane). Additionally, the second channel 1210 and the fourth channel 1224 become aligned (Y-plane). Introduced above with regard to FIG. 13, and as shown in FIG. 14, the first channel 1208 and the third channel 1222 form a first retention chamber for first bearings, while the second channel 1210 and the fourth channel form a second retention chamber for second bearings.

In FIG. 13, the first fastener 900(1) and the second fastener 900(2) are shown uncoupled from the second housing 812. By removing the first fastener 900(1) and the second fastener 900(2), bearings are fed through a first port 1300 and a second port 1302, respectively. That is, the first port 1300 and the second port 1302 provide access such that bearings may be placed within the first channel 1208, the second channel 1210, the third channel 1222, and the fourth channel 1224, respectively. As bearings are supplied, the bearings begin to occupy the first channel 1208, the second channel 1210, the third channel 1222, and the fourth channel 1224. Upon filling of the first channel 1208, the second channel 1210, the third channel 1222, and the fourth channel 1224, the first fastener 900(1) and the second fastener 900(2) are coupled to the second housing 812. For example, the first fastener 900(1) threads into the first port 1300 and the second fastener 900(2) threads into the second port 1302. The fastening of the first fastener 900(1) and the second fastener 900(2) secure the bearings within the first channel 1208, the second channel 1210, the third channel 1222, and the fourth channel 1224. As shown, the first port 600 and the second port 602 extend through a thickness, or wall, of the second housing 812, from an outer surface to the interior surface 1218.

Additionally, when the first fastener 900(1) and the second fastener 900(2) couple to the second housing 812, the first fastener 900(1) and the second fastener 900(2) may occupy at least a portion of the first channel 1208, the second channel 1210, the third channel 1222, and the fourth channel 1224, respectively. In such instances, the first channel 1208, the second channel 1210, the third channel 1222, and the fourth channel 1224 may be void of bearings directly beneath the first port 1300 and the second port 1302, respectively, thereby allowing the first fastener 900(1) and the second fastener 900(2) to couple to the second housing 812. Given this design, the bearings may remain stationary within the first channel 1208, the second channel 1210, the third channel 1222, and the fourth channel 1224 as the first housing 810 rotates.

The bearings within the first channel 1208, the second channel 1210, the third channel 1222, and the fourth channel 1224 couple the first housing 810 and the second housing 812 together. That is, once the bearings are inserted into the first channel 1208, the second channel 1210, the third channel 1222, and the fourth channel 1224, the bearings prevent the separation of the first housing 810 and the second housing 812 (in the X-direction). More particularly, being as bearings are disposed within the first channel 1208 and the third channel 1222, the bearings serve to prevent separation of the first housing 810 and the second housing 812. Additionally, being as bearings are disposed within the second channel 1210 and the fourth channel 1224, the bearings serve to prevent separation of the first housing 810 and the second housing 812. In other words, during pressurizing of the rotating fitting 800, a shear force is exerted on the bearings. However, being as the bearings engage with the first housing 810 and the second housing 812, the bearings resist the shear force and separation of the first housing 810 and the second housing 812.

In some instances, the threads at the proximal end 802 and the distal end 804 may come by way of threaded fittings coupled to the first housing 810 and/or the second housing 812. For example, a first threaded fitting 1304 may couple (e.g., welded, press fit, etc.) to the first housing 810 (so as to represent a portion of the first housing 810). A second threaded fitting 1306 may couple (e.g., welded, press fit, etc.) to the second housing 812 (so as to represent a portion of the second housing 812).

The rotating fitting 800 therefore includes components for coupling the first housing 810 and the second housing 812. The coupling may come by way of bearings that are disposed in channels of the first housing 810 and the second housing 812, respectively. Moreover, the bearings permit rotation of the first housing 810 to provide rotational movement of the spray gun, for example, coupled to the first housing 810. The gasket 1200 further seals the first housing 810 and the second housing 812 to prevent leakages.

Figure 14:
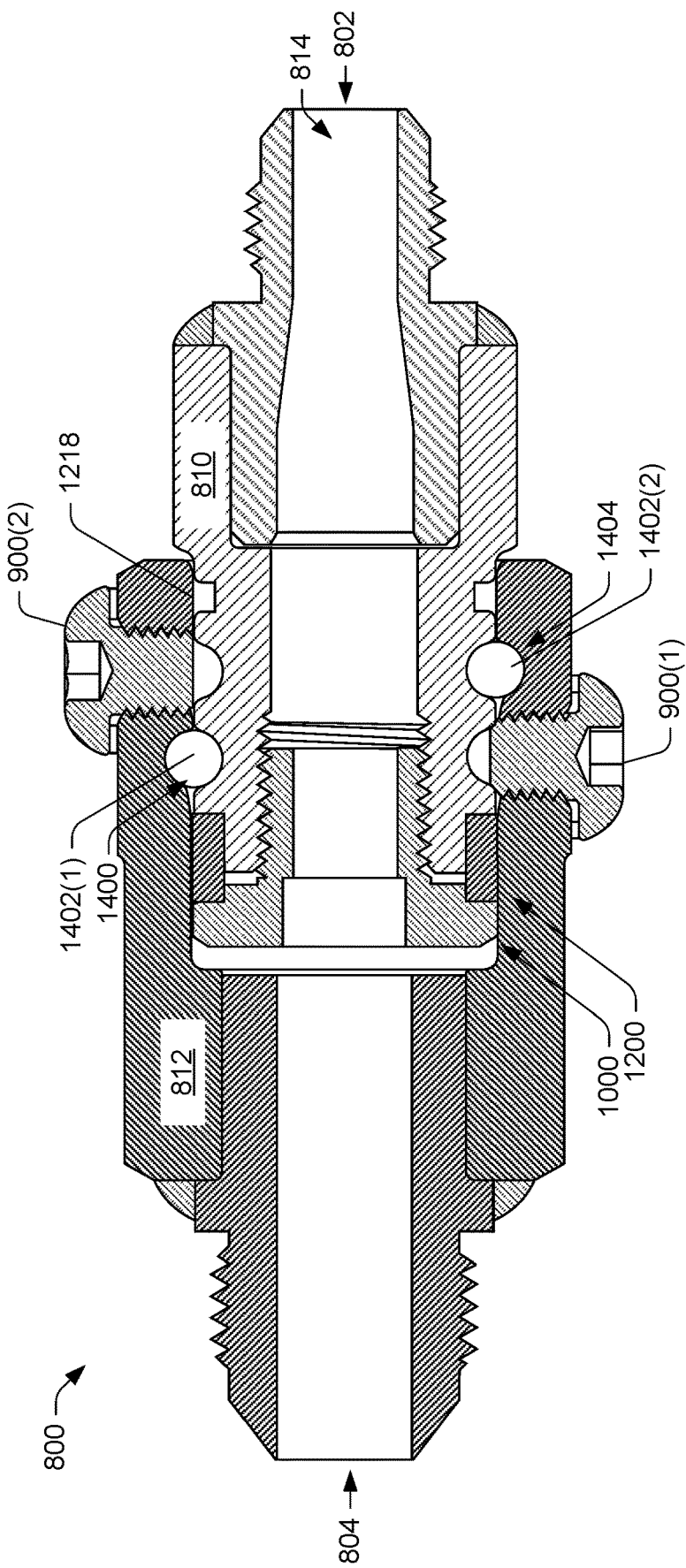
FIG. 14 illustrates a cross-sectional view of the second rotating fitting of FIG. 8, taken along line B-B of FIG. 10, according to an embodiment of the present disclosure.

FIG. 14 illustrates an assembled cross-sectional view of the rotating fitting 800, taken along line B-B of FIG. 10. The first housing 810 is shown at least partially disposed within the second housing 812. Moreover, as explained above with regard to FIG. 13, when the first housing 810 is placed within the second housing 812, the first channel 1208 and the third channel 1222 form a first retention chamber 1400. First bearings 1402(1) reside within the first retention chamber 1400 and couple the first housing 810 and the second housing 812. That is, the first bearings 1402(1) resist longitudinal movement (X-direction) of the first housing 810 and the second housing 812 relative to one another. When the first housing 810 and the second housing 812 are coupled together, the first bearings 1402(1) resist a shear force applied from the pressure experienced by the rotating fitting 800.

Similarly, when the first housing 810 is placed within the second housing 812, the second channel 1210 and the third channel 1222 form a second retention chamber 1404. Second bearings 1402(1) reside within the second retention chamber 1404 and couple the first housing 810 and the second housing 812. The second bearings 1402(1) resist longitudinal movement (X-direction) of the first housing 810 and the second housing 812 relative to one another. When the first housing 810 and the second housing 812 are coupled together, the first bearings 1402(1) resist a shear force applied from the pressure experienced by the rotating fitting 800.

In some instances, the first channel 1208 may receive substantially half of individual bearings of the first bearings 1402(1), and the third channel 1222 may receive substantially half of the individual bearings of the first bearings 1402(1). Additionally, the second channel 1210 may receive substantially half of individual bearings of the second bearings 1402(2), and the fourth channel 1224 may receive substantially half of the individual bearings of the second bearings 1402(2). However, the equal portions of the first bearings 1402(1) need not reside in the first channel 1208 and the third channel 1222, and/or equal portions of the second bearings 1402(2) need not reside in the second channel 1210 and the fourth channel 1224. In such instances, the first channel 1208 and the second channel 1210 may include a greater or lesser depth in the first body 1206 of the first housing 810, and/or the third channel 1222 and the fourth channel 1224 may include a greater or lesser depth in the second body 1220 of the second housing 812. For example, the first body 1206 may form greater than half of the first channel 1208 and/or the second channel 1210, and/or the second body 1220 may form greater than half of the third channel 1222 and/or the fourth channel 1224.

Additionally, although the first retention chamber 1400 and the second retention chamber 1404 are shown being circular in shape, other shapes are envisioned for accommodating differently shaped bearings (e.g., roller bearings, tapered bearings, etc.). As also shown, the first fastener 900(1) is at least partially disposed within the first retention chamber 1400 (or a portion of the first channel 1208 and/or the third channel 1222), and the second fastener 900(2) is at least partially disposed within the second retention chamber 1404 (or a portion of the second channel 1210 and/or the fourth channel 1224). Such design prevent the first bearings 1402(1) and the second bearings 1402(2) annularly rotating about the first retention chamber 1400 and the second retention chamber 1404, respectively.

The gasket 1200 is shown disposed between the first housing 810 and the plug 1000. The interior surface 1232 of the gasket 1200 engages with the flange 1212 of the first housing 810 and the flange 1230 of the plug 1000. The exterior surface 1234 of the of the gasket 1200 engages with the interior surface 1218 of the second housing 812. As the first housing 810 rotates, the gasket 1200 engages with the interior surface 1218 of the second housing 812 to provide a seal between the first housing 810 and the second housing 812. In some instances, tightening the plug 1000 compresses the gasket 1200 against the interior surface 1218 of the second housing 812. For example, as the plug 1000 is tightened, the gasket 1200 is compressed between the plug and the first housing 810. This compression may result in the gasket 1200 applying a force against the interior surface 1218 of the second housing 812. As the gasket 1200 experiences wear, the plug 1000 may be tightened to further secure the gasket 1200 and seal the gasket 1200 with the second housing 812. For example, a hexagonal socket maybe placed through the distal end 804 of the rotating fitting 800 and engaged with the hexagonal head of the plug 1000.

In some instances, edges or surfaces of the first housing 810 and/or the second housing 812 may be chamfered or rounded to prevent damage to the gasket 1200. For example, as the gasket 1200 is inserted into the second housing 812, edges of the first port 1300 and/or the second port 1302, for example, may be chamfered to prevent damage to the gasket 1200. After assembly, the first housing 810, the second housing 812, and the plug 1000 for the passage 814 of the rotating fitting 800, between the proximal end 802 and the distal end 804.

Although the proximal end 802 and the distal end 804 of the rotating fitting 800 are shown including certain receptacles for receiving the spray gun and supply line, respectively, the receptacles may be differently shaped than shown and/or attachments may couple to the proximal end 802 and the distal end 804. For example, a 90 degree or 45 degree elbow may couple to the proximal end 802 and/or the distal end of the rotating fitting 800. Additionally, although the rotating fitting 800 is shown including two retention chambers, the rotating fitting 800 may include more than or less than two retention chambers. The first retention chamber 1400 and the second retention chamber 1404, may also be spaced apart from one another differently than shown (e.g., spaced closer to one another or spaced farther from one another).

The rotating fitting 800 therefore permits rotation of the first housing 810 inside the second housing 812. Additionally, the first bearings 1402(1) and the second bearings 1402(2) engage with the first retention chamber 1400 and the second retention chamber 1404, respectively, formed within the first housing 810 and the second housing 812. The first bearings 1402(1) and the second bearings 1402(2) resist separation of the first housing 810 and the second housing 812 as the rotating fitting 800 experiences pressures associated with metal spray processes (e.g., between 400 PSI and 1200 PSI). Further, the first bearings 1402(1) and the second bearings 1402(2) provide rotational movement to the first housing 810, which is coupled to a spray gun, for example, to reduce movement being imparted to a supply line coupled to the second housing 812.

INDUSTRIAL APPLICATION

The present disclosure describes a rotating fitting that is capable of rotation movement without imparting rotational movement to a supply line. In some instances, the rotating fitting includes a first housing, and a second housing rotatably coupled to the first housing. For example, the first housing may include a first channel that forms a first portion of a retention chamber within which one or more bearings reside, and the second housing may include a second channel that forms a second portion of the retention chamber. By disposing bearings within the retention chamber, the bearings engage within the first channel and the second channel, thereby coupling the first housing and the second housing. Additionally, due to the diameters of the housings and the position of the bearings, the bearings prohibit separation of the first housing and the second housing. The bearings further provide rotational movement to the rotating fitting, between the first housing and the second housing, and without imparting motion to the supply line. This reduces wear and fatigue experienced by the supply line, leading to decreased costs to replace worn parts and/or downtime during manufacturing.

A gasket further seals the first housing and the second housing together to prevent the leakage of gases within the rotating fitting. The gasket may include a graphite material for accommodating the rotating nature of the rotating fitting. For example, as the first housing rotates within the second housing, the gasket may engage with an interior surface of the second housing. A plug engaged with the first housing compresses the gasket between the plug and the first housing. As the gasket experiences wear, for example, the plug may be tightened, thereby compressing the gasket, and reintroducing a seal between the first housing and the second housing. In other words, as the gasket experiences wear, the plug may be tightened to compress the gasket against the second housing and/or the plug may be removed to replace the gasket. By maintaining and/or replacing select components of the rotating fitting, as compared to discarding or replacing an entirety of the rotating fitting, the useful life of the rotating fittings described herein are extended.

While the foregoing invention is described with respect to the specific examples, the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, the claims are not necessarily limited to the specific features or acts described. Rather, the specific features and acts are merely illustrative some embodiments that fall within the scope of the claims of the application.

The invention claimed is:

1. A fitting, comprising:
a first housing having an outer surface, the outer surface defining a first channel and a second channel spaced from the first channel;
a second housing rotatably coupled to the first housing, the second housing having an inner surface, the inner surface defining a third channel and a fourth channel, the third channel mating with and surrounding the first channel to form a first retention chamber, and the fourth channel mating with and surrounding the second channel to form a second retention chamber;
a first bearing disposed within the first retention chamber, the first bearing preventing separation of the first housing and the second housing;
a second bearing disposed within the second retention chamber, the second bearing preventing separation of the first housing and the second housing;
an annular gasket forming a substantially fluid-tight seal between the outer surface of the first housing and the inner surface of the second housing;
a plug threadingly engaged with the first housing, the plug being configured to apply a compression force to the annular gasket; and
a passage defined at least in part by the first housing, the second housing, and the plug.

2. The fitting of claim 1, wherein the second housing further includes:
a first port extending from a second outer surface of the second housing to the third channel, the first port providing access to the first retention chamber; and
a second port extending from the second outer surface to the fourth channel, the second port providing access to the second retention chamber.

3. The fitting of claim 2, further comprising:
a first fastener engaged with the first port; and
a second fastener engaged with the second port.

4. The fitting of claim 3, wherein:
at least a portion of the first fastener is disposed within at least one of the first channel or the third channel when engaged with the first port; and
at least a portion of the second fastener is disposed within at least one of the second channel or the fourth channel when engaged with the second port.

5. The fitting of claim 1, wherein:
the first housing further includes a first flange;
the plug further includes a second flange; and
an interior surface of the annular gasket is disposed at least partially over the first flange and the second flange.

6. The fitting of claim 1, wherein:
due to the threaded engagement between the plug and the first housing, movement of the first housing relative to the second housing causes commensurate movement of the plug relative to the second housing; and
the plug includes a feature for tightening the plug to the first housing, the feature being accessible via a portion of the passage formed at least in part by the second housing.

7. The fitting of claim 1, wherein:
the outer surface of the first housing includes a first substantially cylindrical surface extending substantially concentric with a longitudinal axis of the fitting; and
the annular gasket forms the substantially fluid-tight seal between the first substantially cylindrical surface and the inner surface of the second housing.

8. The fitting of claim 7, wherein:
the outer surface of the first housing includes a second surface adjacent and substantially orthogonal to the first substantially cylindrical surface, the annular gasket being in direct physical contact with the second surface when forming the substantially fluid-tight seal.

9. The fitting of claim 1, wherein:
the first channel and the second channel annularly extend around the first housing, about a longitudinal axis of the fitting; and
the third channel and the fourth channel annularly extend around the second housing, about the longitudinal axis of the fitting.

10. An assembly, comprising:
a first housing having a first channel;
a gasket;
a plug threaded into the first housing, the plug engaging the gasket;

a second housing disposed over the plug and at least a portion of the first housing,
  the first housing being rotatable within the second housing,
  the second housing having a second channel that aligns with the first channel to form a retention chamber, and
  the gasket forming a substantially fluid-tight seal between an outer surface of the first housing and an inner surface of the second housing; and
a bearing disposed within the first channel and the second channel, the bearing preventing separating of the first housing and the second housing, wherein:
  the first housing further has a third channel;
  the second housing further has a fourth channel that aligns with the third channel to form a second retention chamber; and
  the assembly further comprises a second bearing disposed within the third channel and the fourth channel, the second bearing preventing separating of the first housing and the second housing.

11. The assembly of claim 10, wherein:
the plug is configured to seal the first housing and the second housing, via the gasket, based at least in part on tightening the plug into the first housing; and
the plug is accessible via an opening of the second housing.

12. The assembly of claim 10, wherein:
a passage is formed through the assembly; and
the passage is formed at least in part by a substantially cylindrical inner surface of the first housing, the plug, and the inner surface of the second housing, the inner surface of the second housing comprising a substantially cylindrical surface positioned to come into direct physical contact with fluid passing through the assembly via the passage.

13. The assembly of claim 10, wherein:
the plug is formed of a first material,
the second housing is formed of a second material that is different than the first material; and
the gasket is formed of at least one of graphite, carbon, or teflon.

14. The assembly of claim 10, wherein:
the first housing defines a proximal end of the assembly;
the second housing defines a distal end of the assembly;
a passage extends through the assembly, between the proximal end and the distal end;
the proximal end includes first threads for engaging with a spray gun; and
the distal end includes second threads for engaging with supply line.

* * * * *